United States Patent
Mammou

(10) Patent No.: US 11,948,339 B2
(45) Date of Patent: Apr. 2, 2024

(54) ENCODING AND DECODING VISUAL CONTENT

(71) Applicant: Apple Inc., Cupertino, CA (US)

(72) Inventor: Khaled Mammou, Cupertino, CA (US)

(73) Assignee: Apple Inc., Cupertino, CA (US)

(*) Notice: Subject to any disclaimer, the term of this patent is extended or adjusted under 35 U.S.C. 154(b) by 9 days.

(21) Appl. No.: 17/832,816

(22) Filed: Jun. 6, 2022

(65) Prior Publication Data
US 2022/0392115 A1  Dec. 8, 2022

Related U.S. Application Data

(60) Provisional application No. 63/197,037, filed on Jun. 4, 2021.

(51) Int. Cl.
*G06T 9/00* (2006.01)
*G06T 17/20* (2006.01)

(52) U.S. Cl.
CPC ............. *G06T 9/001* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 5,793,371 A * | 8/1998 | Deering | .................. | G06T 9/001 708/203 |
| 5,842,004 A * | 11/1998 | Deering | .................. | G06T 9/001 345/419 |
| 6,215,500 B1 * | 4/2001 | Deering | .................. | G06T 9/001 345/426 |
| 6,429,867 B1 * | 8/2002 | Deering | ............... | H04N 19/597 348/E13.058 |
| 6,459,429 B1 * | 10/2002 | Deering | .................. | G06T 17/20 345/423 |
| 6,525,722 B1 * | 2/2003 | Deering | .................. | G06T 9/001 382/241 |
| 6,525,725 B1 * | 2/2003 | Deering | ................ | G06T 3/0093 345/646 |

(Continued)

OTHER PUBLICATIONS

Mammou et al., "TRAN: A low complexity 3D mesh compression algorithm," Computer Animation and Virtual Worlds, Jun. 2009, 20(2-3):343-54.

(Continued)

*Primary Examiner* — Martin Mushambo
(74) *Attorney, Agent, or Firm* — Fish & Richardson P.C.

(57) ABSTRACT

According to an example method, a system receives first data representing a polygon mesh. The polygon mesh includes a plurality of interconnected vertices forming a plurality of triangles. The system generates second data representing the polygon mesh. Generating the second data includes traversing the vertices of the polygon mesh according to a traversal order, partitioning the plurality of triangles into a set of ordered triangle groups in accordance with the traversal order, and encoding, in the second data, the set of ordered triangle groups. The system outputs the second data. A position each of the vertices in the transversal order is determined based on (i) a number of previously encoded triangles that are incident to that vertex, and/or (ii) a sum of one or more angles formed by the previously encoded triangles that are incident to that vertex.

21 Claims, 26 Drawing Sheets

(56) References Cited

U.S. PATENT DOCUMENTS

| | | | | |
|---|---|---|---|---|
| 6,628,277 | B1 * | 9/2003 | Deering | G06T 9/001 |
| | | | | 345/419 |
| 6,747,644 | B1 * | 6/2004 | Deering | G06T 9/001 |
| | | | | 345/426 |
| 7,068,273 | B2 * | 6/2006 | Takahama | G06T 17/20 |
| | | | | 345/423 |
| 7,071,935 | B1 * | 7/2006 | Deering | G06T 15/04 |
| | | | | 345/419 |
| 8,884,953 | B2 * | 11/2014 | Chen | G06T 9/004 |
| | | | | 382/243 |

OTHER PUBLICATIONS

Mammou [online], "Open 3D Graphics Compression," GitHub.com, available on or before Dec. 3, 2013, retrieved on Dec. 23, 2022, retreived from URL: <https://github.com/KhronosGroup/glTF/wiki/Open-3D-Graphics- Compression/ history>, 4 pages.

\* cited by examiner

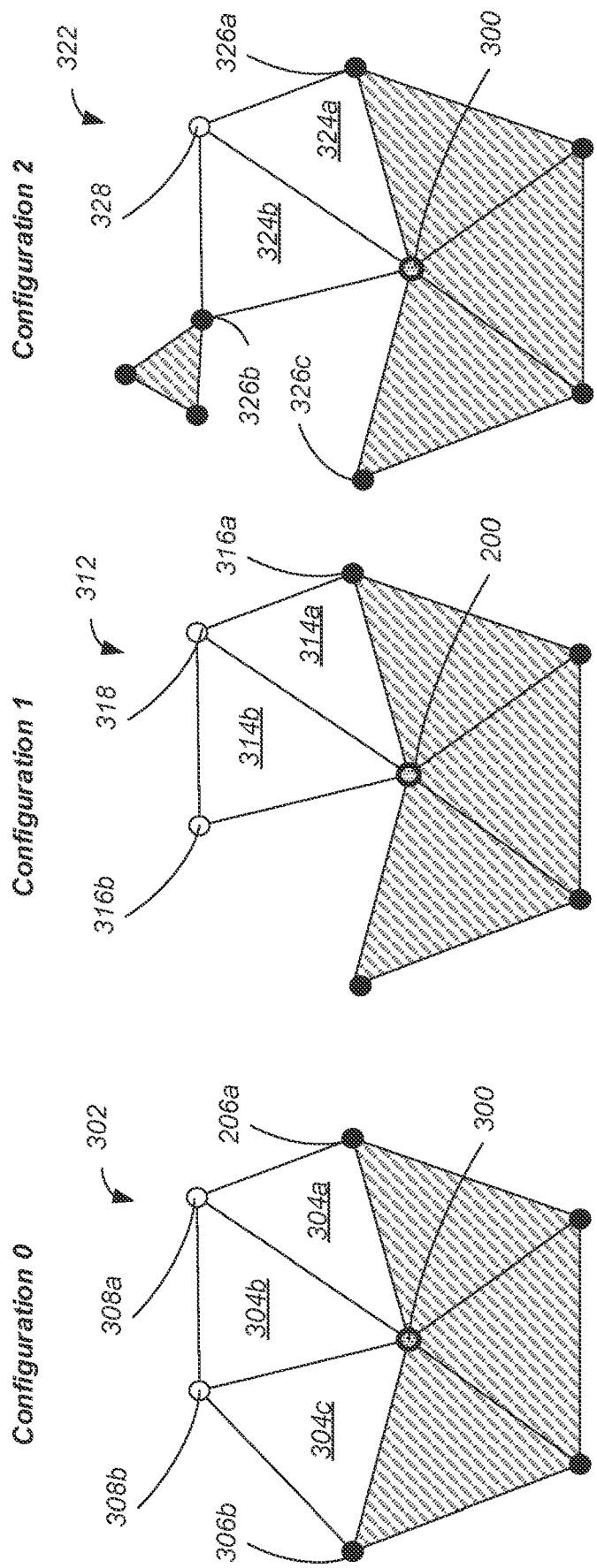

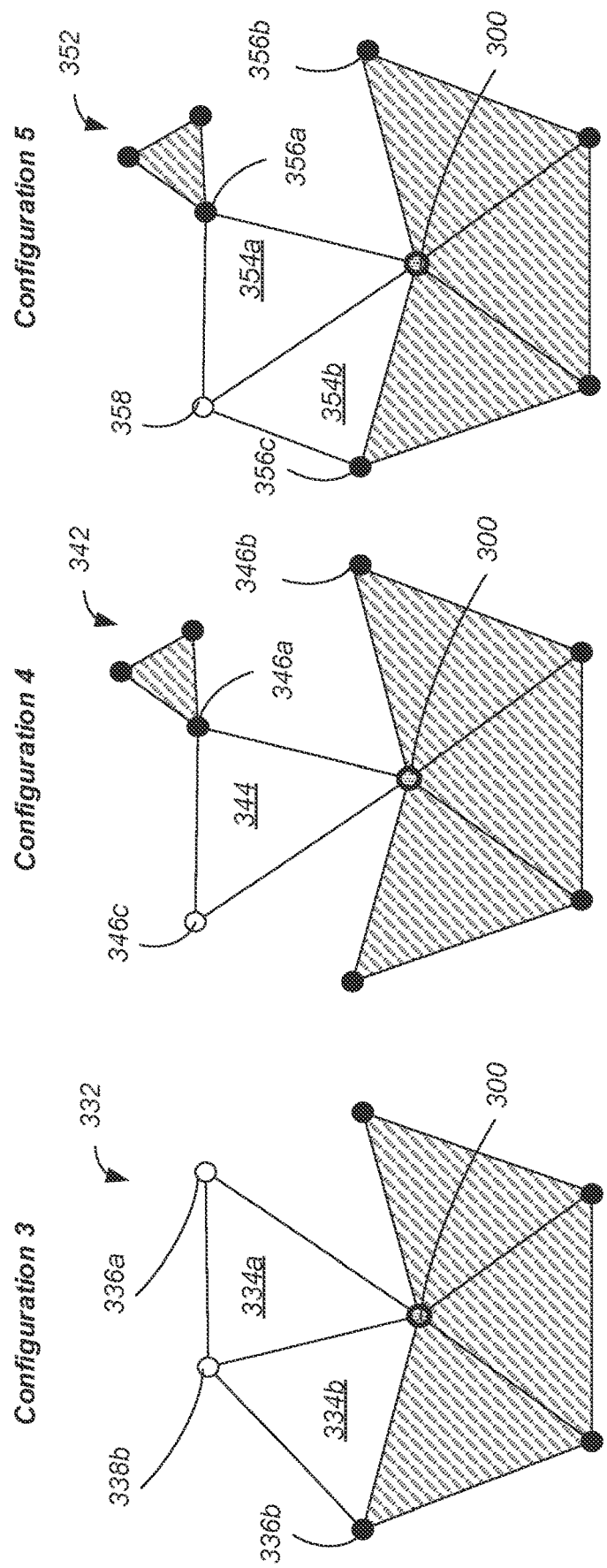

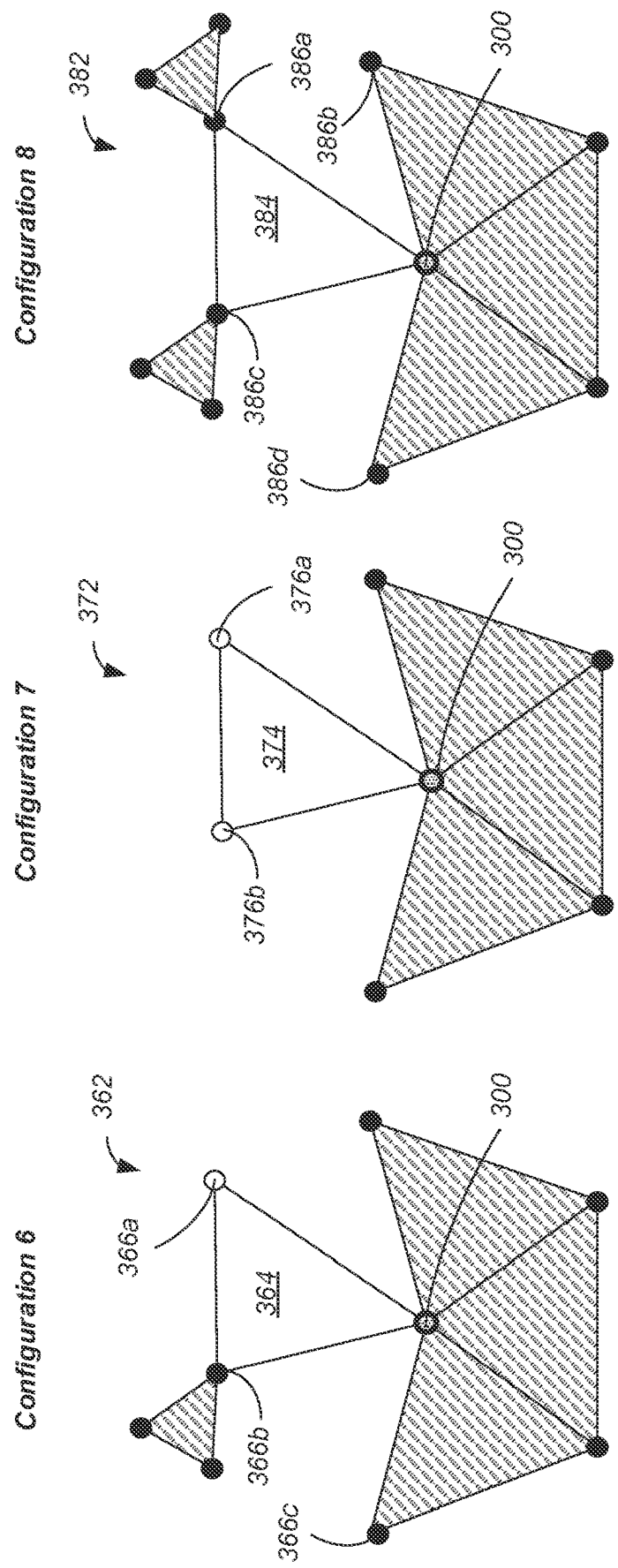

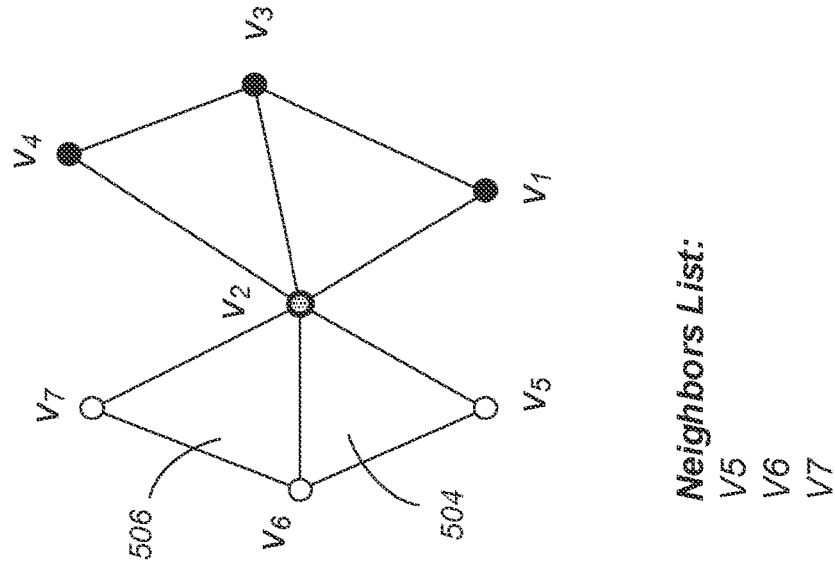
Neighbors List:
V5
V6
V7
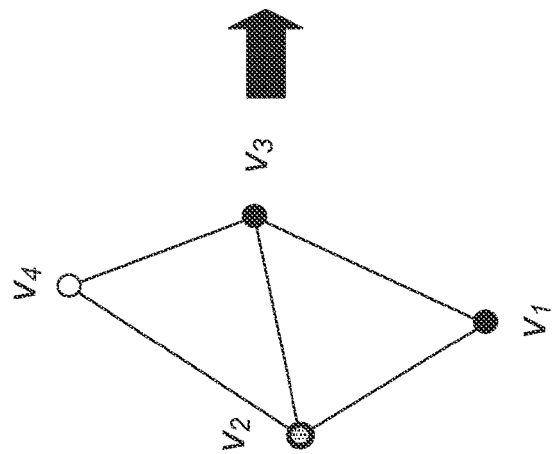
Bitstream:
10 1,(7,1) 2,(1,1),(7,2)
2,(3,2),(1,1) 0 0 0 0 0 0 0
FIG. 5C

US 11,948,339 B2

ENCODING AND DECODING VISUAL CONTENT

CROSS-REFERENCE TO RELATED APPLICATION

This application claims priority to U.S. Provisional Patent Application No. 63/197,037, filed Jun. 4, 2021, the entire contents of which are incorporated herein by reference.

TECHNICAL FIELD

This disclosure relates generally to encoding and decoding visual content.

BACKGROUND

Computer systems can be used to generate and display visual content. As an example, a computer system can generate a three-dimensional model representing the physical characteristics and/or visible appearance of an object. Further, the computer system can render a visual representation of the three-dimensional model, such that it can be viewed by a user on a display device. In some implementations, a visual representation of the three-dimensional model can be displayed according to two dimensions (e.g., using a flat panel display, such as a liquid crystal display or a light emitting diode display). In some implementations, a visual representation of the three-dimensional model can be displayed according to three dimensions (e.g., using a headset or a holographic display).

SUMMARY

In an aspect, a method includes receiving first data representing a polygon mesh, where the polygon mesh includes a plurality of interconnected vertices forming a plurality of triangles; generating second data representing the polygon mesh, where generating the second data includes: traversing the vertices of the polygon mesh according to a traversal order, partitioning the plurality of triangles into a set of ordered triangle groups in accordance with the traversal order, and encoding, in the second data, the set of ordered triangle groups; and outputting the second data. A position each of the vertices in the transversal order is determined based on at least one of: a number of previously encoded triangles that are incident to that vertex, or a sum of one or more angles formed by the previously encoded triangles that are incident to that vertex.

Implementations of this aspect can include one or more of the following features.

In some implementations, the set of ordered triangle groups can include one or more triangle fans.

In some implementations, at least one of the triangle fans can include a plurality of abutting triangles.

In some implementations, the sum of the one or more angles can be determined by: determining, for each of the previously encoded triangles that are incident to that vertex, an angle formed by that triangle according to a quantized scale, and summing the determined angles.

In some implementations, the traversal order can be determined by: generating a plurality of data bins; and for each vertex: determining a priority value for that vertex, and assigning that vertex to one of the data bins based on the priority value.

In some implementations, for each vertex, the priority value of that vertex can be determined based on at least one of: the number of previously encoded triangles that are incident to that vertex, or the sum of the one or more angles formed by the previously encoded triangles that are incident to that vertex.

In some implementations, the method can further include encoding, in the second data, and for each of the vertices, at least one of: an identifier of a first vertex to the right of that vertex, an identifier of a second vertex to the left of that vertex, an identifier of a third vertex to the left of that vertex and that is common to at least one of the triangle groups, or an identifier of a fourth vertex to the right of that vertex and that is common to at least one of the triangle groups.

In some implementations, encoding the set of ordered triangle groups can include for each traversed vertex: identifying a triangle group incident to that vertex that has not yet been encoded; selecting, from among a set of templates, a first template based on a characteristic of the triangle group, and encoding, in the second data, an indication of the first template.

In some implementations, the set of templates can include exactly nine templates. Each of the templates can be different from each of the other templates.

In some implementations, the characteristic of the triangle group can include a position of the triangle group relative to one or more previously encoded triangles.

Other implementations are directed to systems, devices, and non-transitory, computer-readable media having instructions stored thereon, that when executed by one or more processors, causes the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIGS. 3A-3I are diagrams of an example set of candidate configurations used to encode information regarding a polygon mesh.

FIGS. 5A-5F are diagrams showing an example decoding process.

DETAILED DESCRIPTION

Figure 1:
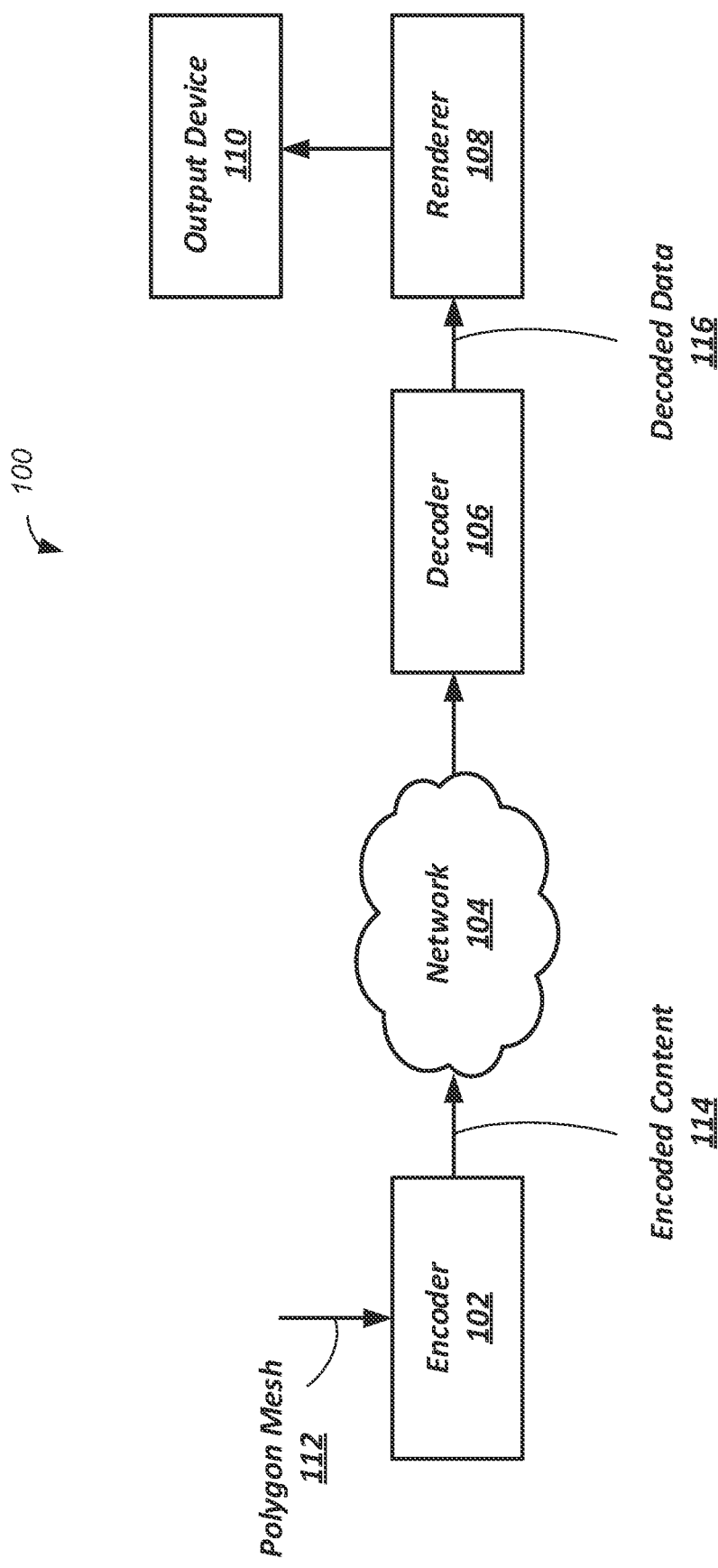
FIG. 1 is a diagram of an example system for encoding and decoding visual content.

In general, computer systems can generate visual content and present the visual content to one or more users. As an example, a computer system can generate a three-dimensional model that represents the physical characteristics and/or visual appearance of an object. The three-dimensional model can include, for instance, one or more meshes (e.g., polygon meshes) that define or otherwise approximate the shape of that object. A polygon mesh can include a collection of interconnected vertices that form several edges (e.g., lines) and faces (e.g., polygons). Together, the vertices, edges, and faces can define a surface representing the shape of an object.

Further, the computer system can render a visual representation of the three-dimensional model, such that it can be viewed by a user on a display device. For example, the computer system can render a visual representation of a polygon mesh in two dimensions, such that the content is suitable for display on a two-dimensional display (e.g., a flat panel display, such as a liquid crystal display or a light emitting diode display). As another example, the computer system can render a visual representation of a polygon mesh in three dimensions, such that the content is suitable for display on a three-dimensional display (e.g., a holographic display or a headset).

In some implementations, a computer system can encode information regarding a polygon mesh in one or more data structures or signals, such that the polygon mesh (or an approximation thereof) can be recreated or regenerated in the future. For example, a first computer system can generate a data stream (e.g., a bit stream) that indicates the position of each of the polygon mesh's vertices, the interconnections between the vertices, and other characteristics of the polygon mesh, and provide the data stream to a second computer system. The second computer system can decode the data stream to extract the encoded information, and generate a representation of the polygon mesh based on the extracted information.

In some implementations, information regarding the polygon mesh can be encoded by traversing the vertices of a polygon mesh according to a particular traversal order, partitioning the plurality of triangles into a set of ordered triangle groups in accordance with the traversal order, and encoding the set of ordered triangle groups in a data stream. Further, each of the vertices' position in the traversal order can be adaptively determined based on one or more characteristics of that vertex. For example, a vertex's position in the traversal order can be determined based on the number of previously encoded triangles that are incident to that vertex. As another example, a vertex's position in the traversal order can be determined based on the sum of one or more angles formed by the previously encoded triangles that are incident to that vertex.

The techniques described herein can provide various technical benefits. In some implementations, the techniques described herein can be used to encode information regarding polygon meshes with a higher degree of efficiency than might otherwise be possible absent performance of these techniques. As an example, information regarding polygon meshes can be encoded in a data stream that has a smaller size (or length) compared to data streams generated using other techniques. This enables computer systems to reduce the amount of resources that are expended to transmit, store, and/or process the data stream. For instance, these techniques can reduce an expenditure of computational resources (e.g., CPU utilization), network resources (e.g., bandwidth utilization), memory resources, and/or storage resources by a computer system in generating, storing, transmitting, and processing visual content. Further, in some implementations, these techniques also enable computer systems to transmit, store, and/or process the data stream more quickly, such that the delay and/or latency with which visual content is displayed to a user is reduced.

FIG. 1 is a diagram of an example system 100 for processing and displaying visual content. The system 100 includes an encoder 102, a network 104, a decoder 106, a renderer 108, and an output device 110.

Figure 2:
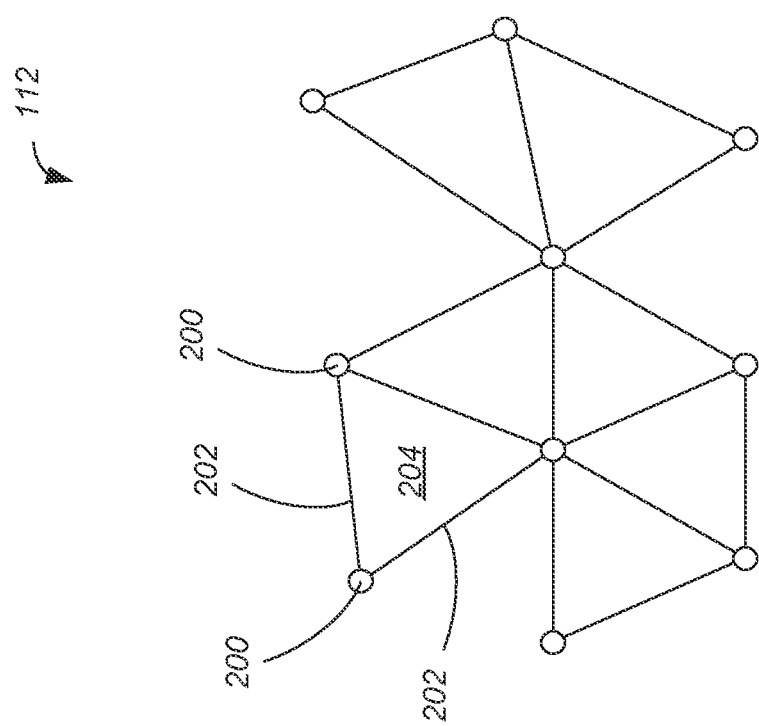
FIG. 2 is a diagram of an example polygon mesh.

During an example operation of the system 100, the encoder 102 receives information regarding a polygon mesh 112. An example of a polygon mesh 112 is shown in FIG. 2. The polygon mesh 112 includes a collection of vertices 200 that are interconnected by respective edges 202 (e.g., lines extending between two respective vertices). Further, the edges 202 define a collection of polygonal faces 204 (e.g., regions enclosed by the edges). Together, the vertices 200, edges 202, and faces 204 define one or more surfaces representing the shape of an object.

In some implementations, the polygon mesh 112 can include triangular faces (e.g., as shown in FIG. 2). In some implementations, the polygon mesh 112 can include faces having other shapes (e.g., quadrilaterals, pentagons, hexagons, etc.). In some implementations, the polygon mesh 112 can include faces having a single shape only. In some implementations, the polygon mesh 112 can include faces having two or more different shapes (e.g., a combination of triangle faces, quadrilateral faces, and/or any other shaped faces).

In some implementations, the polygon mesh 112 can represent a three-dimensional shape of an object. In some implementations, the polygon mesh 112 can represent a two-dimensional shape of an object.

In some implementations, the polygon mesh 112 can be generated using a photogrammetry process. For example, the system 100 (or another system) can receive image data regarding one or more objects obtained from several different perspectives (e.g., a series of images taken of the one or more objects from different angles and/or distances). Based on the image data, the system 100 (or another system) can determine the shape of the object, and generate one or more polygon meshes having or approximating that shape.

In some implementations, the polygon mesh 112 can be generated based on measurements obtained by light detection and ranging (LIDAR) systems, three-dimensional cameras, and/or three-dimensional scanners. For example, a LIDAR system can obtain information regarding an object, such as a point cloud representing the spatial locations of several points on the object's surface. Based on the point cloud, the system 100 (or another system) can determine the shape of the object, and generate one or more polygon meshes having or approximating that shape.

The encoder 102 generates encoded content 114 based on the polygon mesh 112. The encoded content 114 includes information representing the characteristics of the polygon mesh 112, and enables computer systems (e.g., the system 100 or another system) to recreate the polygon mesh 112 or approximation thereof. As an example, the encoded content 114 can include one or more data streams (e.g., bit streams) that indicate the position of one or more of the vertices 200 of the polygon mesh, one or more interconnections between the vertices 200 (e.g., the edges 202), and/or one or more faces 204 defined by the edges 202). Further, the encoded content 114 can include information regarding additional characteristics of the polygon mesh 112, such as one or more colors, textures, visual patterns, opacities, and/or other characteristics associated with the polygon mesh 112 (or a portion thereof).

The encoded content 114 is provided to a decoder 106 for processing. In some implementations, the encoded content 114 can be transmitted to the decoder 106 via a network 104. The network 104 can be any communications networks through which data can be transferred and shared. For example, the network 104 can be a local area network (LAN) or a wide-area network (WAN), such as the Internet. The network 104 can be implemented using various networking interfaces, for instance wireless networking interfaces (e.g., Wi-Fi, Bluetooth, or infrared) or wired networking interfaces (e.g., Ethernet or serial connection). The network 104 also can include combinations of more than one network, and can be implemented using one or more networking interfaces.

The decoder 106 receives the encoded content 114, and extracts information regarding the polygon mesh 112 included in the encoded content 114 (e.g., in the form of decoded data 116). For example, the decoder 106 can extract information regarding the vertices 200, edges 202, and/or faces 204, such as the location of each of the vertices 200, the interconnections between the vertices 200 (e.g., the edges 202), and the faces 204 formed by those interconnections. As another example, the decoder 106 can extract information regarding additional characteristics of the polygon mesh 112, such as one or more colors, textures, visual patterns, opacities, and/or other characteristics associated with the polygon mesh 112 (or a portion thereof).

The decoder 106 provides the decoded data 116 to the renderer 108. The renderer 108 renders content based on the decoded data 116, and presents the rendered content to a user using the output device 110. As an example, if the output device 110 is configured to present content according to two dimensions (e.g., using a flat panel display, such as a liquid crystal display or a light emitting diode display), the renderer 108 can render the content according to two dimensions and according to a particular perspective, and instruct the output device 110 to display the content accordingly. As another example, if the output device 110 is configured to present content according to three dimensions (e.g., using a holographic display or a headset), the renderer 108 can render the content according to three dimensions and according to a particular perspective, and instruct the output device 110 to display the content accordingly.

In some implementations, the encoded content 114 can be generated by traversing the vertices 200 of the polygon mesh 112 according to a particular traversal order, partitioning the faces 204 of the polygon mesh 112 into a set of ordered polygon groups in accordance with the traversal order, and encoding the set of ordered polygon groups in a data stream. In particular, the set of ordered polygons groups can represent the interconnections between several vertices to the polygon mesh 112 (e.g., the edges of the polygon mesh 112).

In some implementations, the faces 204 of the polygon mesh 112 can be triangles (e.g., as shown in FIG. 2). Further, the triangular faces 204 can be partitioned into a set of ordered triangle groups in accordance with the traversal order, and the set of ordered triangle groups can be encoded in a data stream.

In some implementations, each of the triangle groups can include a single triangle, or multiple triangles that abut one another (e.g., where each triangle shares a respective common edge with another triangle) and collectively share a common vertex (e.g., a common "pivot point"). Triangle groups can also be referred to as triangle fans.

Further, each of the triangle groups can be encoded by identifying, from among a set of candidate configurations (e.g., a set of pre-defined templates or patterns), a particular configuration corresponding to that triangle group. The identified candidate configuration can be signaled in the encoded content 114. Further, the number of triangles in the triangle group can also be signaled in the encoded content 114.

An example set of nine candidate configurations is shown in FIGS. 3A-3I. In each of these configurations, hashed triangles indicate triangles that have already been encoded by the encoder 102 (e.g., triangles for which the encoder 102 has already inserted information in the encoded content 114), and solid white triangles indicate a triangle group that are newly encoded by the encoder 102 (e.g., the triangles for which the encoder 102 has most recently inserted information in the encoded content 114). Further, black solid circles indicate vertices that have already been encoded by the encoder 102, and the white solid circles indicate vertices that are newly encoded by the encoder 102. Further, in each of these configurations, the dotted circle indicates the vertex that is common to the triangles of the newly encoded triangle group (e.g., a pivot point of a newly encoded triangle fan).

The examples shown in FIGS. 3A-3I are described with reference to vertices that are to the "right" or "left" of a pivot point. The "right" and "left" directions can be determined based on the position of each of the vertices of a triangle relative to one another.

Figure 8A:
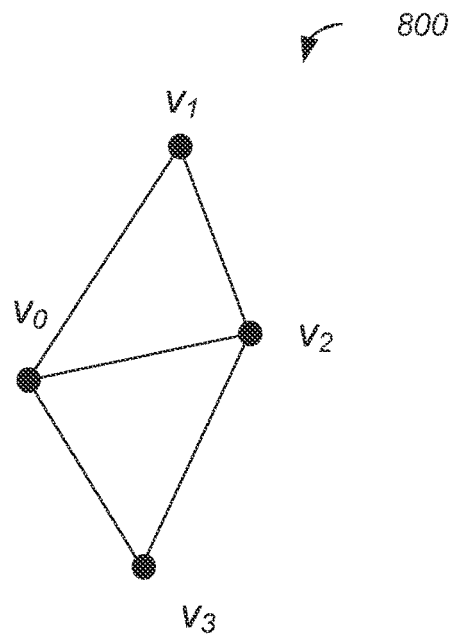
FIGS. 8A and 8B are diagrams of example triangle groups.

For example, FIG. 8A shows a triangle group 800 having four vertices $V_1$, $V_2$, $V_3$, and $V_4$. In this example configuration, the vertex $v_1$ is to the left of the vertex $v_0$, and the vertex $v_3$ is to the right of the vertex $v_0$. Further, the vertex $v_2$ is to the left of the vertex $v_1$, and the vertex $v_0$ is to the right of the vertex $v_1$. Further, the vertex $v_3$ is to the left of the vertex $v_2$, and the vertex $v_1$ is to the right of the vertex $v_2$. Further, the vertex $v_0$ is to the left of the vertex $v_3$, and the vertex $v_2$ is to the right of the vertex $v_3$.

Figure 8B:
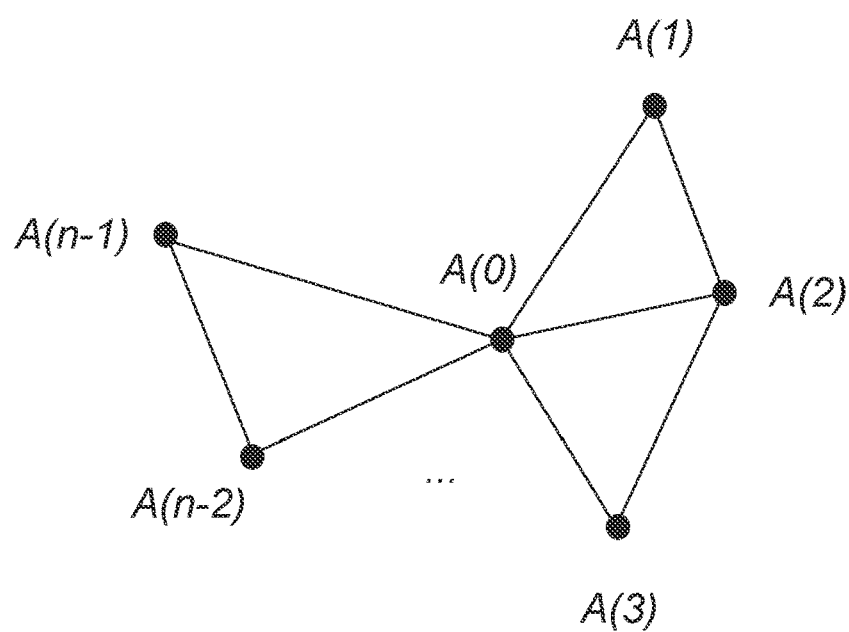

As another example, FIG. 8B shows a generalized triangle group 850 having n vertices A(0), A(1), . . . , A(n−1). The vertex to the left of the vertex A(i) can be the vertex A((i+1) modulo n). Further, the vertex to the right of the vertex A(i) can be the vertex A((i−1+n) modulo n).

If a particular technique is used by the encoder to determine "left" and "right" vertices (e.g., when generating the encoded content 114), that same technique is also used by the decoder to process the encoded information (e.g., to generate the decoded data 116). In some implementations, the technique that was used to determine left or right vertices can be signaled in the encoded content. In some implementations, the technique can be pre-determined (e.g., such that an encoder and decoder process data using the same technique).

As shown in FIG. 3A, Configuration 0 indicates that a triangle group 302 having one or more triangles (e.g., triangles 304a-304c) is newly encoded in a data stream. According to this configuration, at least a first triangle 304a can be encoded, where the triangle 304a is incident to the pivot point 300 and the already-encoded vertex 306a to the right of the pivot point 300. Further, according to this configuration, one or more additional triangles (e.g., triangles 304b and 304c) can be subsequently encoded in a sequence, where the last triangle that can be encoded (e.g., the triangle 304c) is incident to the pivot point 300 and the already-encoded vertex 306b to the left of the pivot point 300. Further, in this configuration each of the vertices between the already-encoded vertices 306a and 306b (e.g., the vertices 308a and 308b) are newly encoded.

Although FIG. 3A shows three newly encoded triangles, in practice, Configuration 0 can be used to indicate the encoding of any number of new triangles (e.g., one, two, three, four, or more). The number of newly encoded triangles can be signaled in the encoded content 114.

As shown in FIG. 3B, Configuration 1 indicates that a triangle group 312 having one or more triangles (e.g., triangles 314a and 314b) is newly encoded in a data stream. According to this configuration, at least a first triangle 314a can be encoded, where the triangle 314a is incident to the pivot point 300 and the already-encoded vertex 316a to the right of the pivot point 300. Further, according to this configuration, one or more additional triangles (e.g., triangle 214b) can be subsequently encoded, where the last triangle that can be encoded (e.g., the triangle 314b) is incident to the pivot point 300 and a newly encoded vertex 316b. Further, in this configuration each of the vertices between the already-encoded vertex 316a and the newly encoded vertex 316b (e.g., the vertex 318) are newly encoded.

Although FIG. 3B shows two newly encoded triangles, in practice, Configuration 1 can be used to indicate the encoding of any number of new triangles (e.g., one, two, three, four, or more). The number of newly encoded triangles can be signaled in the encoded content 114.

As shown in FIG. 3C, Configuration 2 indicates that a triangle group 322 having one or more triangles (e.g., triangles 324a and 324b) is newly encoded in a data stream. According to this configuration, at least a first triangle 324a can be encoded, where the triangle 324a is incident to the pivot point 300 and the already-encoded vertex 326a to the right of the pivot point 300. Further, according to this configuration, one or more additional triangles (e.g., triangle 324b) can be subsequently encoded, where the last triangle that can be encoded (e.g., the triangle 324b) is incident to the pivot point 300 and an already-encoded vertex 326b other than the already-encoded vertex 326c to the left of the pivot point 300. Further, in this configuration each of the vertices between the already-encoded vertices 326a and 326b (e.g., the vertex 328) are newly encoded.

Although FIG. 3C shows two newly encoded triangles, in practice, Configuration 2 can be used to indicate the encoding of any number of new triangles (e.g., one, two, three, four, or more). The number of newly encoded triangles can be signaled in the encoded content 114.

As shown in FIG. 3D, Configuration 3 indicates that a triangle group 332 having one or more triangles (e.g., triangles 334a and 334b) will be encoded in a data stream. According to this configuration, at least a first triangle 334a can be encoded, where the triangle 334a is incident to the pivot point 300 and a newly encoded vertex 336a. Further, according to this configuration, one or more additional triangles (e.g., triangle 334b) can be subsequently encoded, where the last triangle that can be encoded (e.g., the triangle 334b) is incident to the pivot point 300 and an already-encoded vertex 336b that is to the left of the pivot point 300. Further, in this configuration each of the vertices between the newly encoded vertex 336a and the already encoded vertex 336b (e.g., the vertex 338) are newly encoded.

Although FIG. 3C shows two newly encoded triangles, in practice, Configuration 3 can be used to indicate the encoding of any number of new triangles (e.g., one, two, three, four, or more). The number of newly encoded triangles can be signaled in the encoded content 114.

As shown in FIG. 3E, Configuration 4 indicates that a triangle group 342 having one or more triangles (e.g., triangle 344) is newly encoded in a data stream. According to this configuration, at least a first triangle 344 can be encoded, where the triangle 344 is incident to the pivot point 300 and an already-encoded vertex 346a other than the already-encoded vertex 346b to the right of the pivot point 300. Further, according to this configuration, one or more additional triangles can be subsequently encoded, where the last triangle that can be encoded is incident to the pivot point 300 and a newly encoded vertex 346c. Further, in this configuration each of the vertices between the already-encoded vertex 346a and the newly encoded vertex 346c are newly encoded.

Although FIG. 3E shows one newly encoded triangle, in practice, Configuration 4 can be used to indicate the encoding of any number of new triangles (e.g., one, two, three, four, or more). The number of newly encoded triangles can be signaled in the encoded content 114.

As shown in FIG. 3F, Configuration 5 indicates that a triangle group 352 having one or more triangles (e.g., triangles 354a and 354b) is newly encoded in a data stream. According to this configuration, at least a first triangle 354a can be encoded, where the triangle 354a is incident to the pivot point 300 and an already-encoded vertex 356a other than the already-encoded vertex 356b to the right of the pivot point 300. Further, according to this configuration, one or more additional triangles (e.g., triangle 354b) can be subsequently encoded, where the last triangle that can be encoded (e.g., the triangle 354b) is incident to the pivot point 300 and an already-encoded vertex 356c to the left of the pivot point 300. Further, in this configuration each of the vertices between the already-encoded vertices 356a and 356c (e.g., the vertex 358) are newly encoded.

Although FIG. 3F shows two newly encoded triangles, in practice, Configuration 5 can be used to indicate the encoding of any number of new triangles (e.g., one, two, three, four, or more). The number of newly encoded triangles can be signaled in the encoded content 114.

As shown in FIG. 3G, Configuration 6 indicates that a triangle group 362 having one or more triangles (e.g., triangle 364) is newly encoded in a data stream. According to this configuration, at least a first triangle 364 can be encoded, where the triangle 354 is incident to the pivot point 300 and a newly encoded vertex 366a. Further, according to this configuration, one or more additional triangles can be subsequently encoded, where the last triangle that can be encoded is incident to the pivot point 300 and an already-encoded vertex 366b other than the already-encoded vertex 366c to the left of the pivot point 300. Further, in this configuration each of the vertices between the newly encoded vertex 366a and the already-encoded vertex 366b are newly encoded.

Although FIG. 3G shows one newly encoded triangle, in practice, Configuration 6 can be used to indicate the encoding of any number of new triangles (e.g., one, two, three, four, or more). The number of newly encoded triangles can be signaled in the encoded content 114.

As shown in FIG. 3H, Configuration 7 indicates that a triangle group 372 having one or more triangles (e.g., triangle 374) is newly encoded in a data stream. According to this configuration, at least a first triangle 374 can be encoded, where the triangle 374 is incident to the pivot point 300 and a newly encoded vertex 376a. Further, according to this configuration, one or more additional triangles can be subsequently encoded, where the last triangle that can be encoded is incident to the pivot point 300 and a newly encoded vertex 376b. Further, in this configuration each of the vertices between the newly encoded vertices 376a and 376b are newly encoded.

Although FIG. 3H shows one newly encoded triangle, in practice, Configuration 7 can be used to indicate the encoding of any number of new triangles (e.g., one, two, three, four, or more). The number of newly encoded triangles can be signaled in the encoded content 114.

As shown in FIG. 3I, Configuration 8 indicates that a triangle group 382 having one or more triangles (e.g., triangle 384) is newly encoded in a data stream. According to this configuration, at least a first triangle 384 can be encoded, where the triangle 384 is incident to the pivot point 300 and an already-encoded vertex 386a other than the already-encoded vertex 386b to the right of the pivot point 300. Further, according to this configuration, one or more additional triangles can be subsequently encoded, where the last triangle that can be encoded is incident to the pivot point 300 and an already-encoded vertex 386c other than the already-encoded vertex 386d to the right of the pivot point 300. Further, in this configuration each of the vertices between the already-encoded vertices 386a and 386c are newly encoded.

Although FIG. 3I shows one newly encoded triangle, in practice, Configuration 8 can be used to indicate the encoding of any number of new triangles (e.g., one, two, three, four, or more). The number of newly encoded triangles can be signaled in the encoded content 114.

In some implementations, a set of candidate configurations can include exactly nine candidate configurations (e.g., the configurations shown in FIGS. 3A-3I). In some implementations, a set of candidate configurations can include a different number of candidate configurations (e.g., including at least a subset of the configurations shown in FIGS. 3A-3I).

As described above, information regarding the polygon mesh can be encoded by traversing the vertices 200 of the polygon mesh 112 according to a particular traversal order. Each of the vertices' position in the traversal order can be adaptively determined based on one or more characteristics of that vertex 200.

For example, a vertex's position in the traversal order can be determined based on the order can be selected based on the number of previously encoded triangles that are incident to that vertex (e.g., a "valence-based traversal"). A vertex having a greater number of previously encoded triangles that are incident to that vertex can be prioritized in the traversal order over a vertex having a lesser number of previously encoded triangles that are incident to that vertex. For example, a first vertex having three incident previously encoded triangles can be prioritized over a second vertex having one incident previously encoded triangle.

As another example, a vertex's position in the traversal order can be determined based on the sum of one or more angles formed by the previously encoded triangles that are incident to that vertex (e.g., a "geometry-based traversal"). A vertex having a larger angular sum can be prioritized in the traversal order over a vertex having a smaller angular sum. For example, a first vertex having an angular sum of 75° can be prioritized over a second vertex having an angular sum of 15°.

FIGS. 4A-4F show an example encoding process using the configurations shown in FIGS. 3A-3I.

Figure 4A:
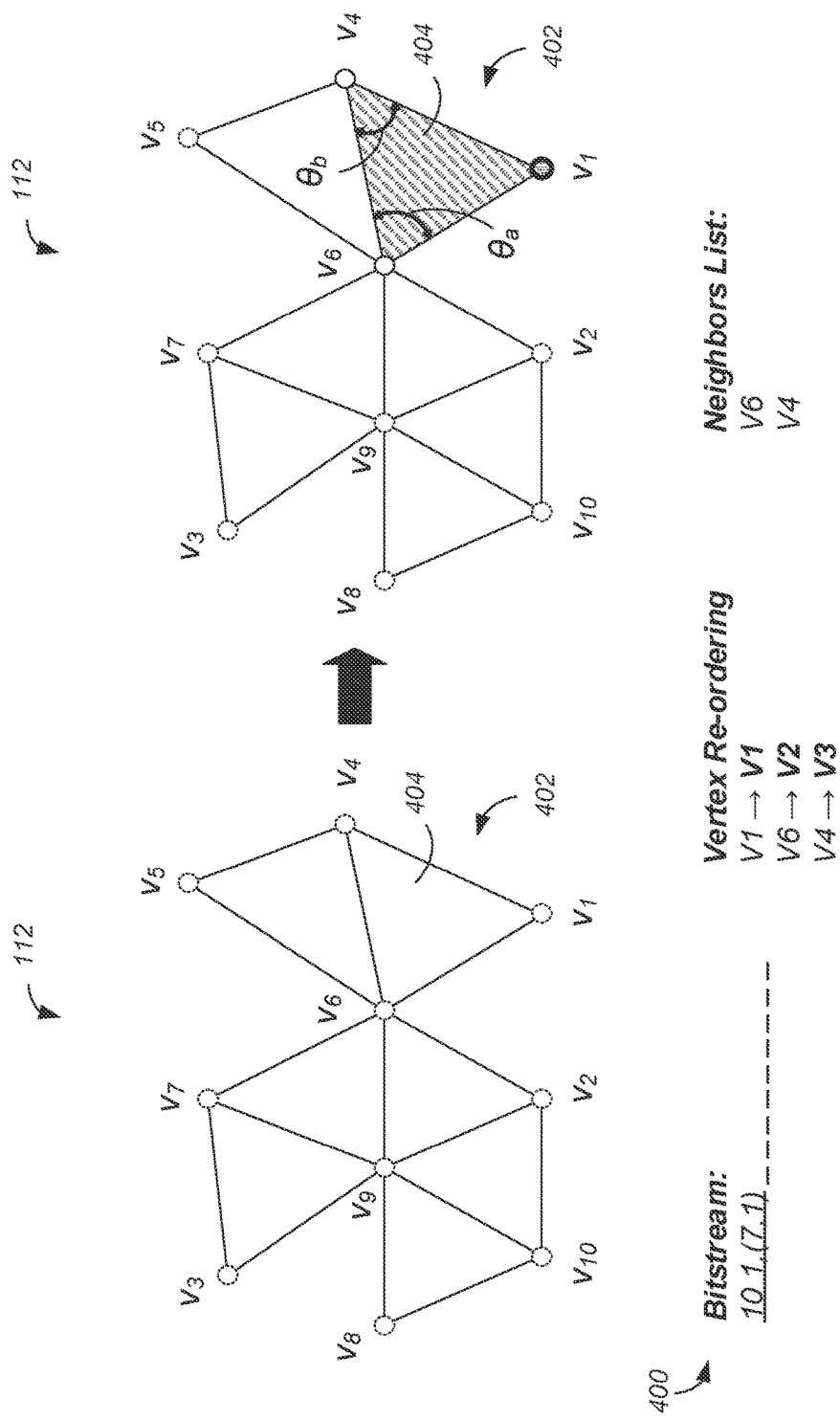
FIGS. 4A-4F are diagrams showing an example encoding process.

As shown in FIG. 4A, a polygon mesh 112 includes several interconnected vertices (labeled as $V_1$ to $V_{10}$). During the encoding process, the encoder 102 identifies number of vertices in the polygon mesh 112 (e.g., 10), and signals the number of vertices in a data stream 400.

Further, the encoder 102 traverses the vertices according to a traversal order, and signals information regarding triangle groups incident to each of the traversed vertices in the data stream 400.

For example, as shown in FIG. 4A, the encoder 102 traverses the first vertex $V_1$, and identifies a single triangle group 402 incident to the vertex $V_1$ (including a single triangle 404) that has not yet been encoded. The encoder 102 determines that the triangle group 402 corresponds with the Configuration 7. For example, the triangle group 402 includes a triangle that is incident to the vertex $V_1$ (which functions as a pivot point), and the triangle is defined by "new" vertices $V_6$ and $V_4$ (e.g., vertices that have not yet been encoded). Further, the encoder 102 determines that the triangle group 402 includes a single triangle 404. The encoder signals this information in the data stream 400 as "1,(7,1)," where the initial "1" indicates that one triangle group is incident to the vertex $V_1$ that has not yet been encoded, "7" indicates the configuration of that triangle group, and the subsequent "1" indicates that the triangle group includes a single triangle.

Further, the encoder 102 can identify the vertices neighboring the vertex $V_1$ (e.g., vertices $V_6$ and $V_4$). Further, the encoder 102 can re-order the vertices to reflect the order in which the vertices have been encoded. For example, the vertex $V_1$ can be maintained as $V_1$, the vertex $V_6$ can be re-ordered as $V_2$, and the vertex $V_4$ can be re-ordered as $V_3$.

The encoder 102 traverses to the next vertex according to a traversal order. For example, the encoder 102 can select, from among the already encoded vertices $V_6$ and $V_4$, the vertex having the greater number of previously encoded triangles that are incident to that vertex (e.g., a valence-based traversal). If two or more vertices meet this criterion, one of those vertices can be selected (e.g., randomly, or sequentially according to the re-ordered list). As another example, the encoder 102 can select, from among the already encoded vertices $V_6$ and $V_4$, the vertex having the largest sum of angles formed by the previously encoded triangles that are incident to that vertex (e.g., a geometry-based traversal). If two or more vertices meet this criterion, one of those vertices can be selected (e.g., randomly, or sequentially according to the re-ordered list).

In this example, the vertex $V_6$ has a single incident previously encoded triangle (e.g., the triangle 404). Likewise, the vertex $V_6$ has a single incident previously encoded triangle (e.g., the triangle 404). According to a valence-based traversal, the vertices $V_6$ and $V_4$ have the same priority. Thus, one of these vertices can be selected for traversal randomly or based on the re-ordered list.

Further, in this example, the triangle 404 incident to the vertex $V_6$ forms an angle of $\theta_a$ at the vertex. Further, triangle 404 incident to the vertex $V_6$ forms an angle of $\theta_b$ at the vertex. If $\theta_a$ is greater than $\theta_b$, according to a geometry-based traversal, the vertex $V_6$ can have a high priority in the traversal order than the vertex $V_4$. Alternatively, if $\theta_b$ is greater than $\theta_a$, according to a geometry-based traversal, the vertex $V_4$ can have a high priority in the traversal order than the vertex $V_6$. If $\theta_a$ and $\theta_b$, according to a geometry-based traversal, the vertices $V_6$ and $V_4$ have the same priority, and one of these vertices can be selected for traversal randomly or based on the re-ordered list.

Figure 4B:
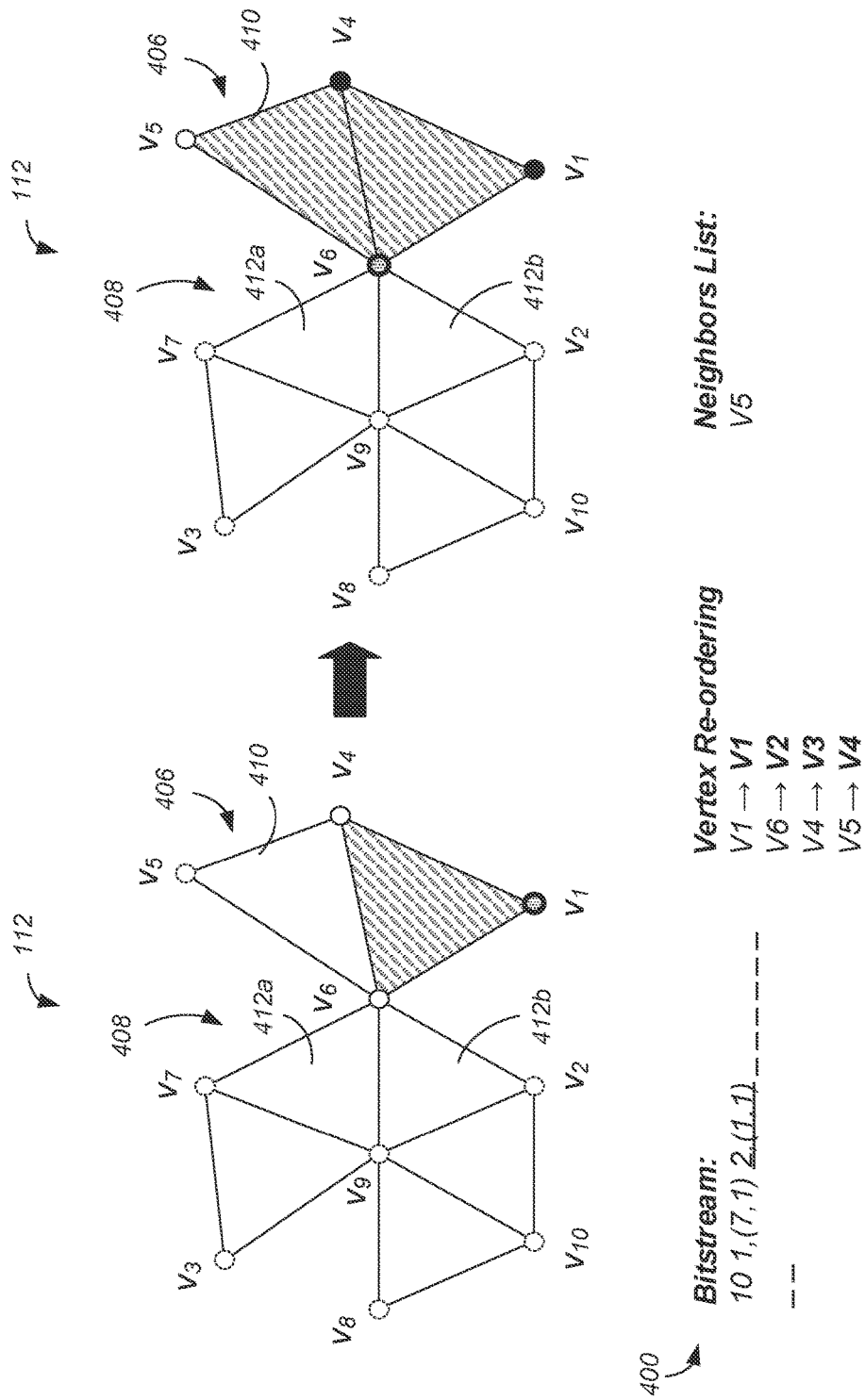

In this example, the vertex $V_6$ is selected over the vertex $V_4$ (e.g., based on geometry-based traversal, or based on random selection or the re-ordered list). Accordingly, as shown in FIG. 4B, the encoder 102 traverses the vertex $V_6$ next, and identifies a two triangles groups 406 and 408 incident to the vertex $V_6$ that have not yet been encoded. The first triangle group 406 includes a single triangle 410, and the second triangle group 408 includes two triangles 412a and 412b. The encoder signals this information in the data stream 400 as "2," which indicates that indicates two triangle groups are incident to the vertex $V_6$ that have not yet been encoded.

As shown in FIG. 4B, the encoder 102 determines that the first triangle group 406 corresponds with the Configuration 1. For example, the triangle group 406 includes a triangle that is incident to the vertex $V_6$ (which functions as a pivot point), and the triangle is defined by a single new vertex $V_5$ and a previously encoded vertex $V_4$. Further, the encoder 102 determines that the triangle group 406 includes a single triangle 410. The encoder signals this information in the data stream 400 as "(1,1)," where the initial "1" indicates the configuration of the first triangle group 406, and the subsequent "1" indicates that the first triangle group 406 includes a single triangle.

Further, the encoder 102 can identify the vertices neighboring the vertex $V_6$ (e.g., vertex $V_5$). Further, the encoder 102 can re-order the vertices to reflect the order in which the vertices have been encoded. For example, the vertex $V_5$ can be re-ordered as $V_4$.

Figure 4C:
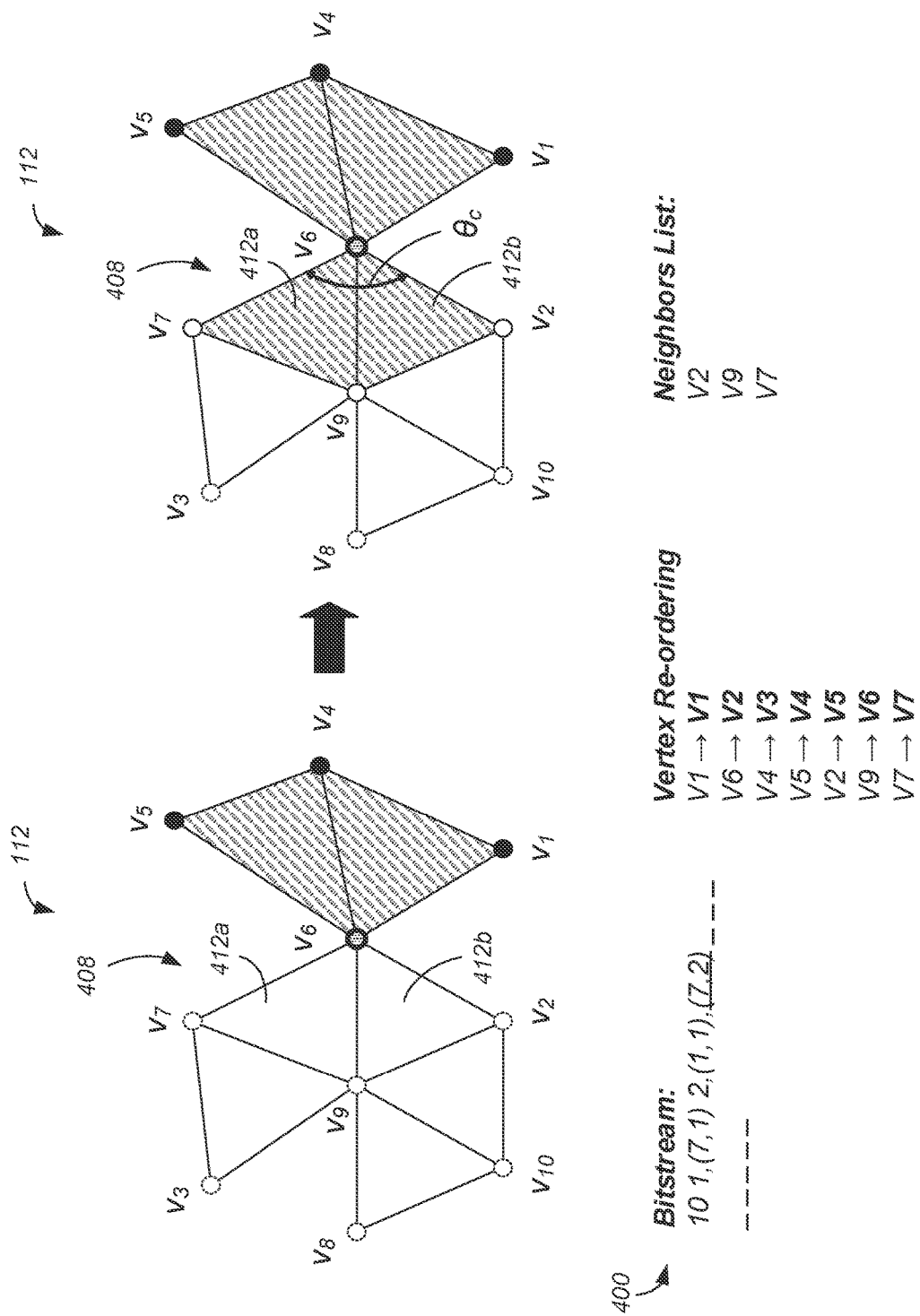

Further, as shown in FIG. 4C, the encoder 102 determines that the second triangle group 408 corresponds with the Configuration 7. For example, the triangle group 408 includes triangles that are incident to the vertex $V_6$ (which functions as a pivot point), and the triangles are defined by new vertices $V_2$, $V_9$, and $V_7$. Further, the encoder 102 determines that the triangle group 408 includes two triangles 412a and 412b. The encoder signals this information in the data stream 400 as "(7,2)," where "7" indicates the configuration of the second triangle group 408, and "2" indicates that the second triangle group 408 includes two triangles.

Further, the encoder 102 can identify the vertices neighboring the vertex $V_6$ (e.g., vertices $V_2$, $V_9$, and $V_7$). Further, the encoder 102 can re-order the vertices to reflect the order in which the vertices have been encoded. For example, the vertex $V_2$ can be re-ordered as $V_5$, the vertex $V_9$ can be re-ordered as $V_6$, and the vertex $V_7$ can be re-ordered as $V_7$.

Subsequently, the encoder 102 traverses to the next vertex according to a traversal order. For example, the encoder 102 can select, from among the already encoded vertices $V_4$, $V_5$, $V_2$, $V_9$, and $V_7$ based on a valence-based traversal or a geometry-based traversal.

In this example, the vertex $V_9$ would be selected based either a valence-based traversal or a geometry-based traversal. For example, the vertex $V_9$ has two incident previously encoded triangles (e.g., the triangles 412a and 412b), whereas each of the other vertices $V_4$, $V_5$, $V_2$, and $V_7$ has a single respective incident previously encoded triangle. Further, the triangles 412a and 412b form an angle of $\theta_c$ at the vertex that is greater than the angles formed at each of the other vertices $V_4$, $V_5$, $V_2$, and $V_7$ by the respective previously encoded triangles incident to those vertices.

Figure 4D:
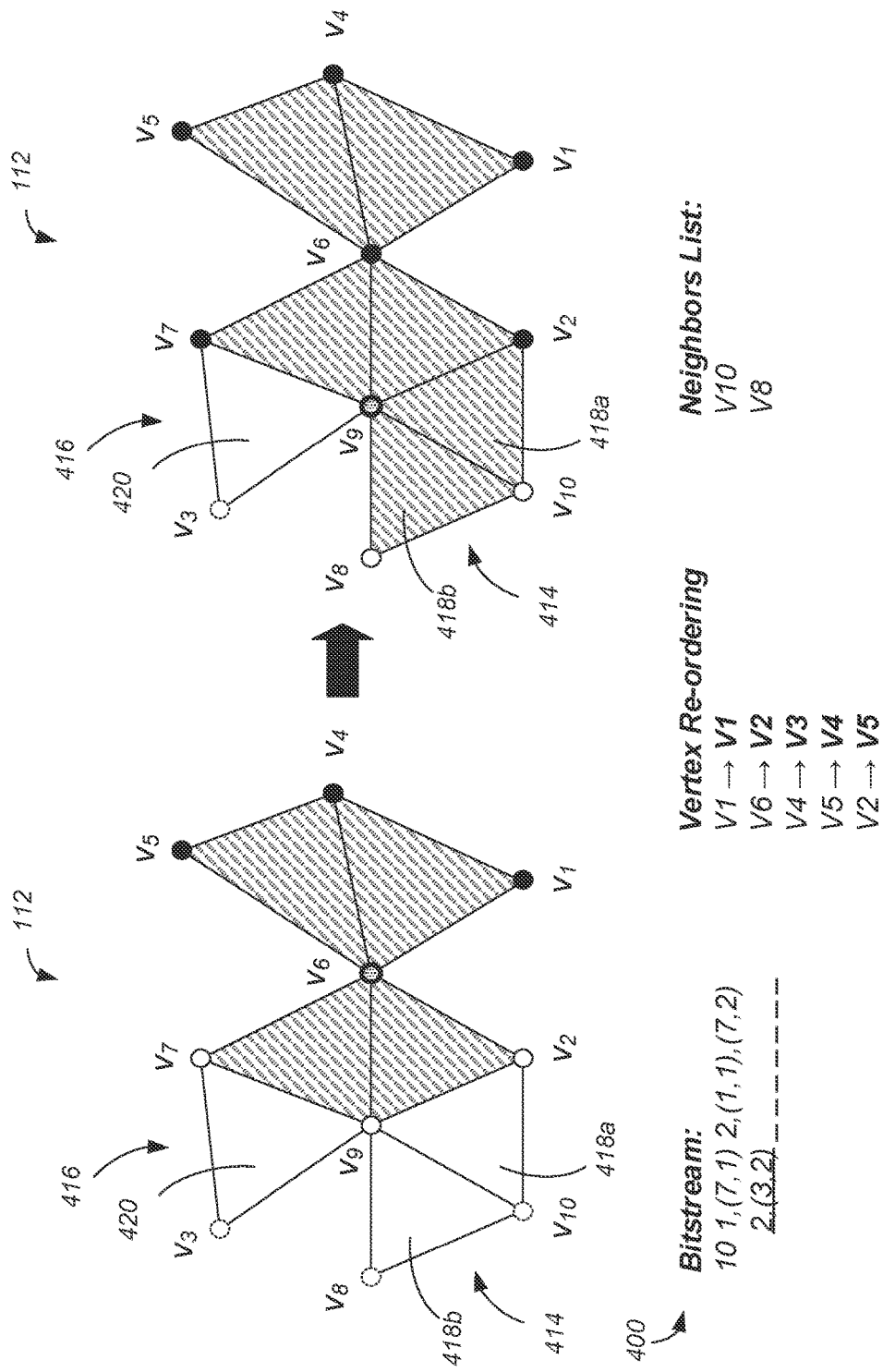

Accordingly, as shown in FIG. 4D, the encoder 102 traverses the vertex $V_9$ next, and identifies a two triangles groups 414 and 416 incident to the vertex $V_9$ that have not yet been encoded. The first triangle group 414 includes two triangles 418a and 418b, and the second triangle group 416 includes a single triangle 420. The encoder signals this information in the data stream 400 as "2," which indicates that indicates two triangle groups are incident to the vertex $V_9$ that have not yet been encoded.

As shown in FIG. 4D, the encoder 102 determines that the first triangle group 406 corresponds with the Configuration 3. For example, the triangle group 414 includes triangle that are incident to the vertex $V_9$ (which functions as a pivot point), and the triangles are defined by a previously encoded vertex $V_2$ and two new vertices $V_{10}$ and $V_8$. Further, the encoder 102 determines that the triangle group 414 includes two triangles 418a and 418b. The encoder signals this information in the data stream 400 as "(3,2)," where "3" indicates the configuration of the first triangle group 414, and "2" indicates that the first triangle group 414 includes two triangles.

Further, the encoder 102 can identify the vertices neighboring the vertex $V_9$ (e.g., vertices $V_{10}$ and $V_8$). Further, the encoder 102 can re-order the vertices to reflect the order in which the vertices have been encoded. For example, the vertex $V_{10}$ can be re-ordered as $V_8$, and the vertex $V_8$ can be re-ordered as $V_9$.

Figure 4E:
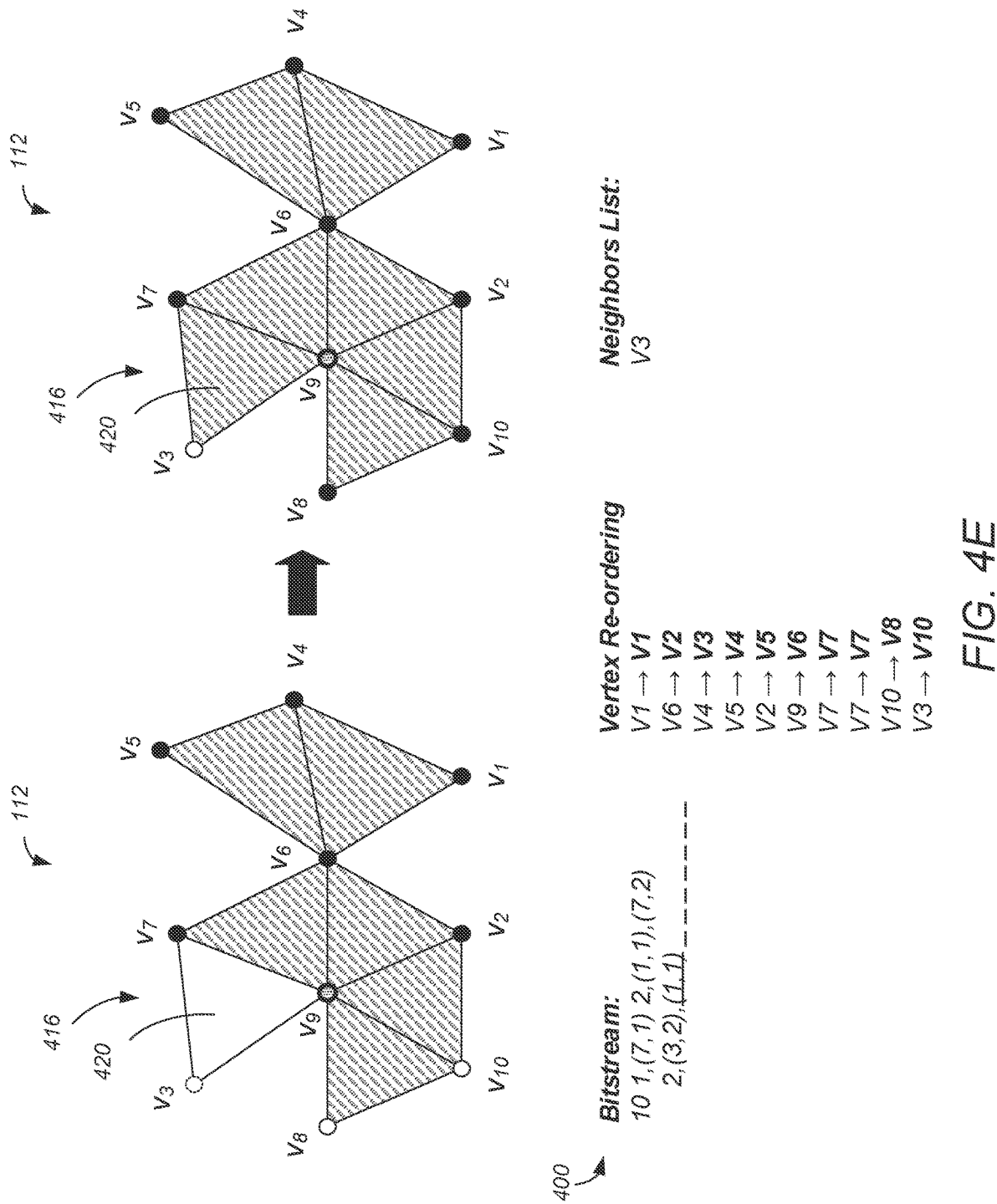

Further, as shown in FIG. 4E, the encoder 102 determines that the second triangle group 416 corresponds with the Configuration 1. For example, the triangle group 416 includes a triangle that is incident to the vertex $V_9$ (which functions as a pivot point), and the triangle is defined by a new vertex $V_3$ and a previously encoded vertex $V_7$. Further, the encoder 102 determines that the triangle group 420 includes a single triangle 420. The encoder signals this information in the data stream 400 as "(1,1)," where the initial "1" indicates the configuration of the second triangle group 416, and the subsequent "1" indicates that the second triangle group 416 includes a single triangle.

Further, the encoder 102 can identify the vertices neighboring the vertex $V_9$ (e.g., vertex $V_3$). Further, the encoder 102 can re-order the vertices to reflect the order in which the vertices have been encoded. For example, the vertex $V_3$ can be re-ordered as $V_{10}$.

Figure 4F:
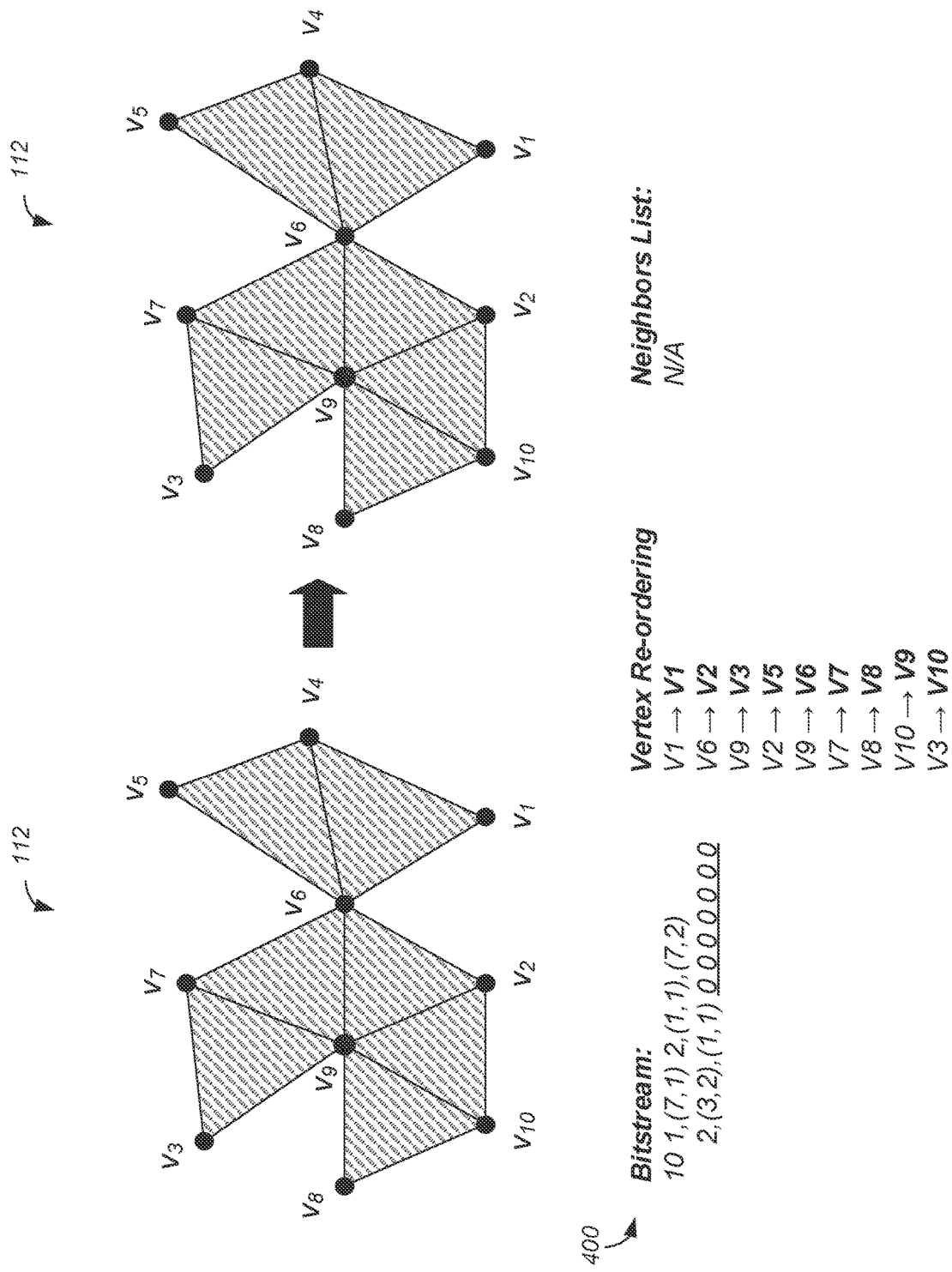

As shown in FIG. 4F, the encoder traverses each of the remaining vertices. However, as no un-encoded triangles remain for these vertices, the encoder signals this information in the data stream 400 as a series of zeros (e.g., seven zeros, with one zero for each of the remaining vertices).

FIGS. 5A-5F show an example decoding process using the configurations shown in FIGS. 3A-3I and the data stream 400 encoded according to FIGS. 4A-4F.

A decoder 106 receives encoded content 114 including the data stream 400, parses the data stream 400, and recreates the polygon mesh 112 based on the parsed information.

Figure 5A:
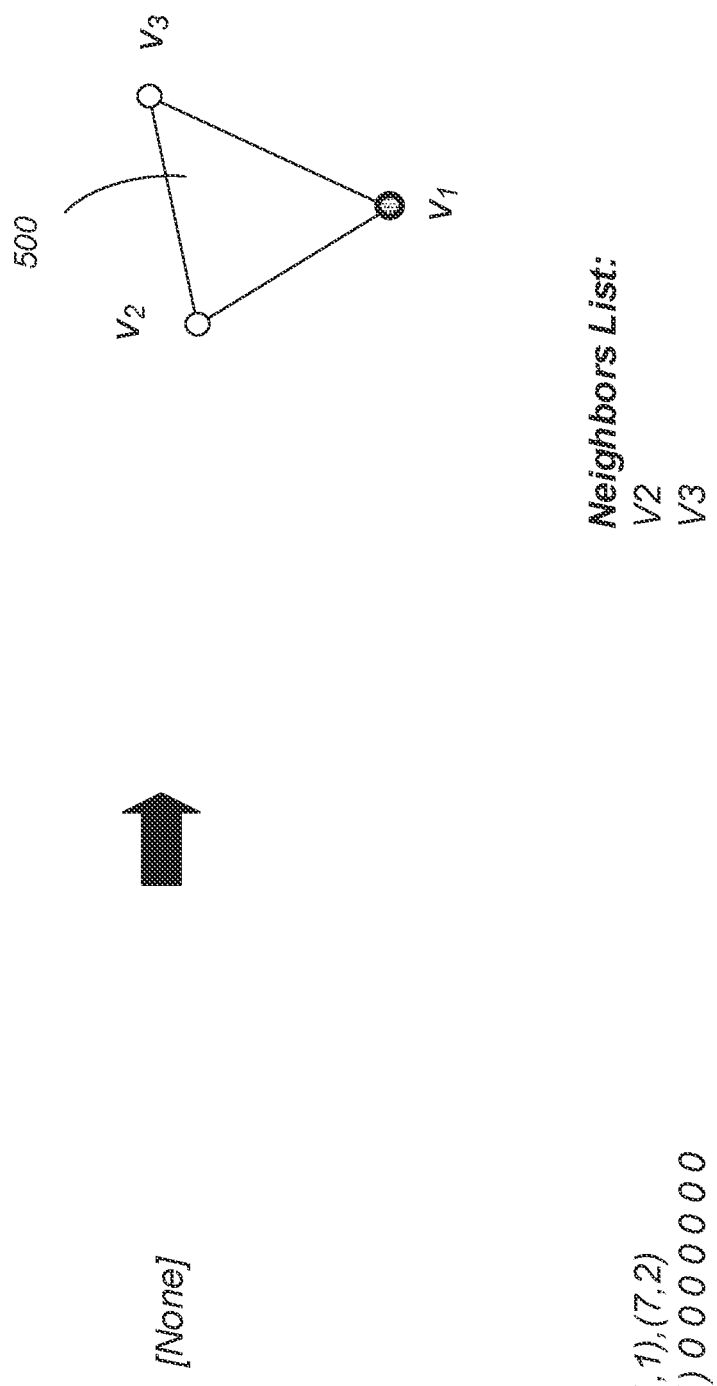

For example, as shown in FIG. 5A, the decoder 106 parses the initial value "10" from the data stream 400, and recognizes the polygon mesh 112 includes 10 vertices. Further, the decoder 106 parses the data "1,(7,1)," and recognizes that a single triangle group should be added to a first vertex (e.g., vertex $V_1$), where the triangle group has a Configuration 7 with a single triangle. In response, the decoder 106 creates a triangle 500 in accordance with the specified configuration.

Figure 5B:
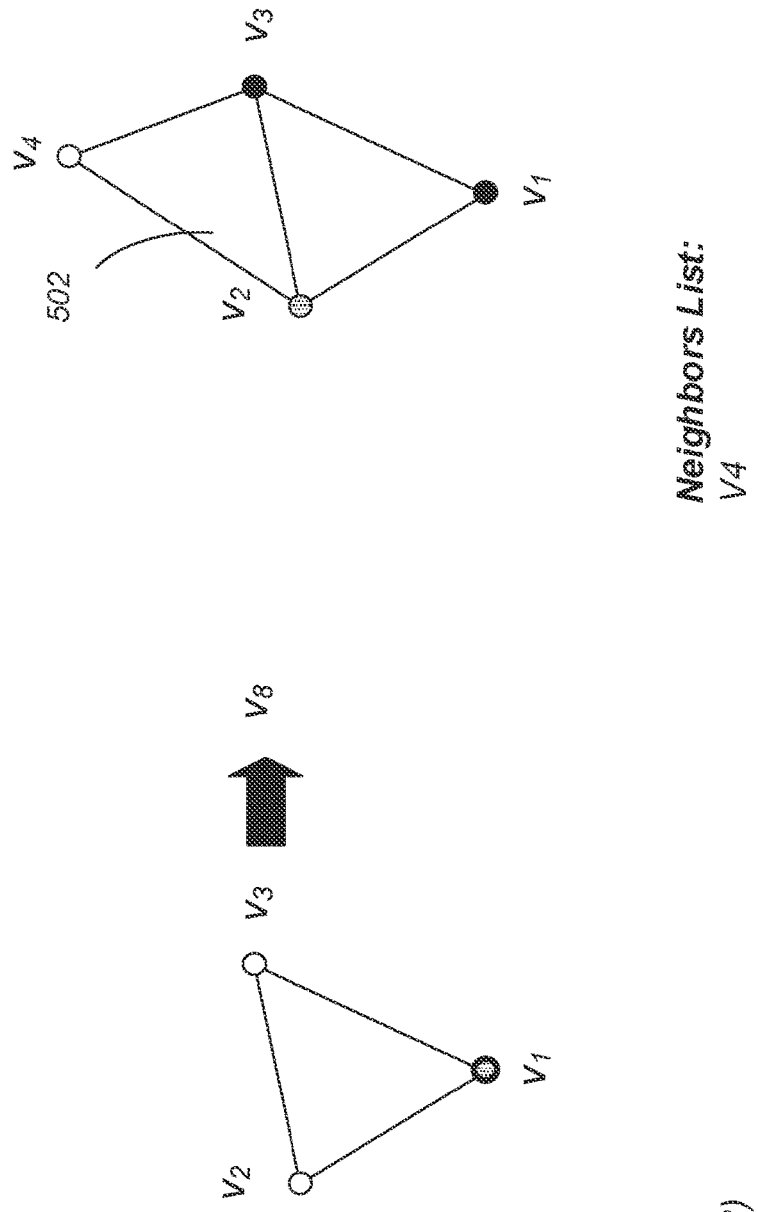

As shown in FIG. 5B, the decoder 106 parses the data "2,(1,1)," and recognizes that two triangle groups should be added to the next vertex in the traversal order (e.g., selected according to a valence-based traversal or a geometry-based traversal). Further, the decoder 106 determines that the first triangle group has a Configuration 1 with a single triangle. In response, the decoder 106 selects the next vertex according to the traversal order (e.g., in this example, vertex $V_2$), and creates a triangle 502 in accordance with the specified configuration.

Further, as shown in FIG. 5C, the decoder 106 parses the data "(7,2)," and recognizes that the second triangle group has a Configuration 7 with two triangles. In response, the decoder 106 additionally creates two triangles 504 and 506 in accordance with the specified configuration.

Figure 5D:
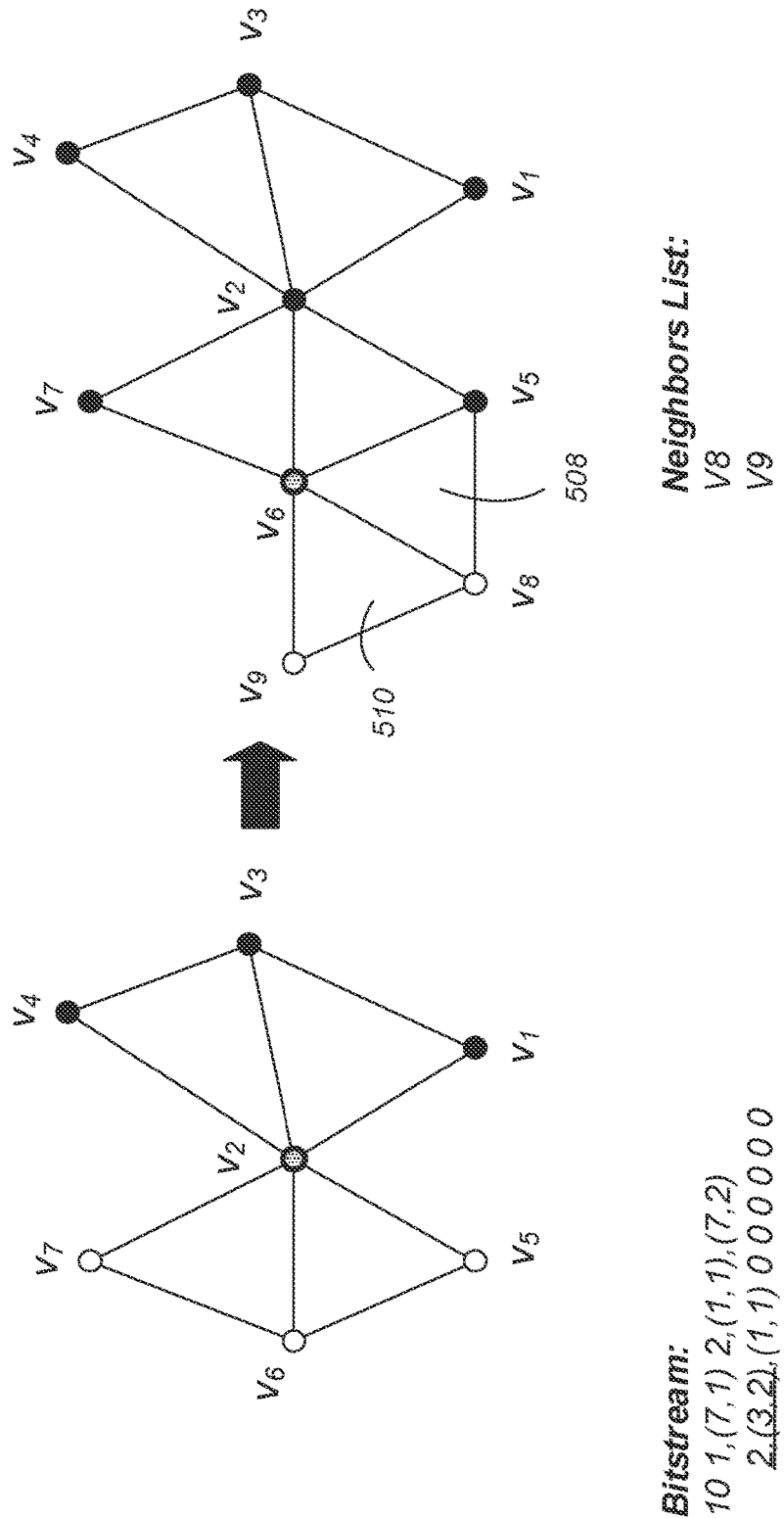

Further, as shown in FIG. 5D, the decoder 106 parses the data "2,(3,2)," and recognizes that two triangle groups should be added to the next vertex in the traversal order (e.g., selected according to a valence-based traversal or a geometry-based traversal). Further, the decoder 106 determines that the first triangle group has a Configuration 3 with two triangles. In response, the decoder 106 selects the next vertex according to the traversal order (e.g., in this example, vertex $V_6$), and creates two triangles 508 and 510 in accordance with the specified configuration.

Figure 5E:
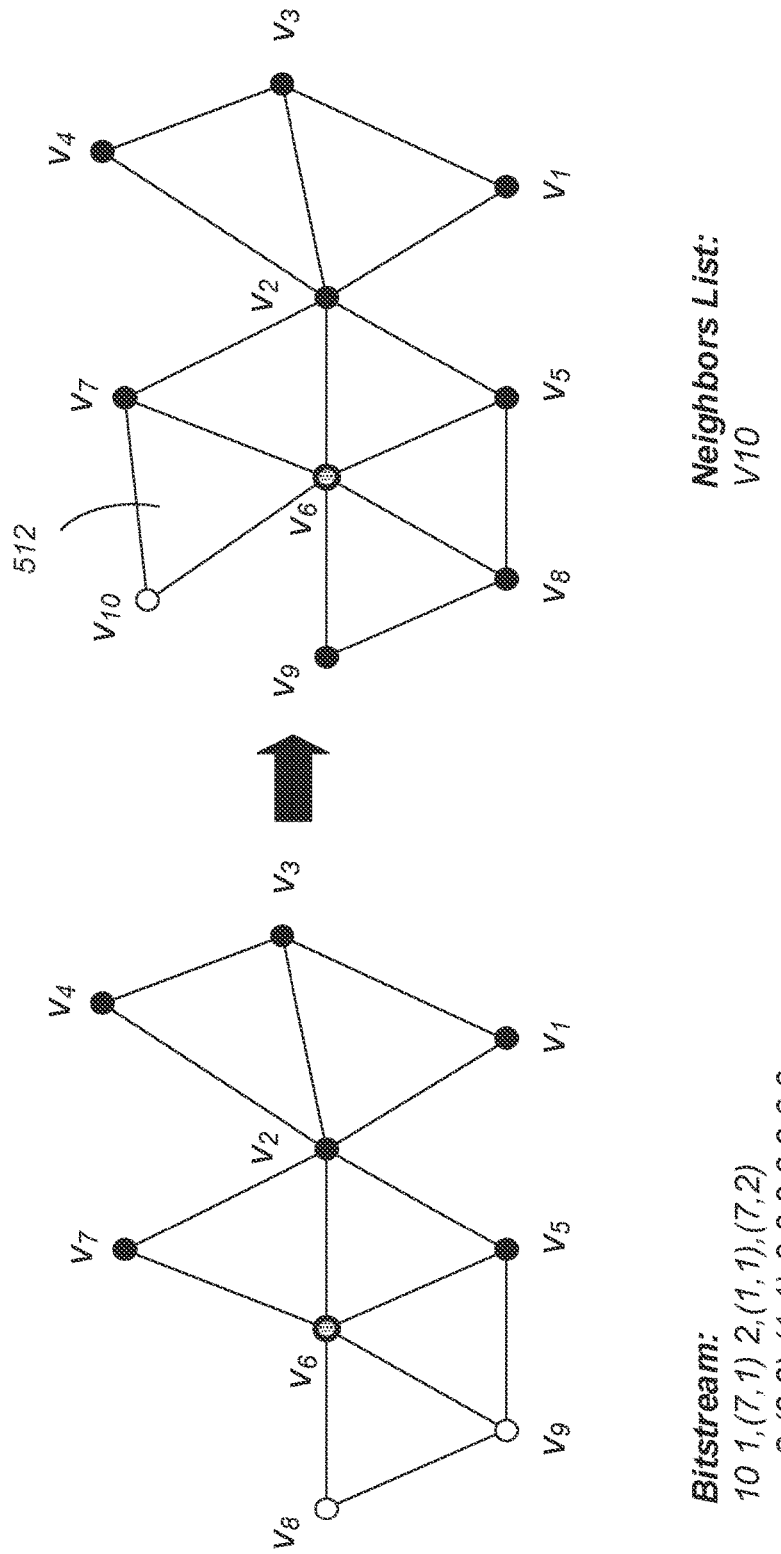

Further, as shown in FIG. 5E, the decoder 106 parses the data "(1,1)," and recognizes that the second triangle group has a Configuration 1 with a single triangle. In response, the decoder 106 additionally creates a triangle 512 in accordance with the specified configuration.

Figure 5F:
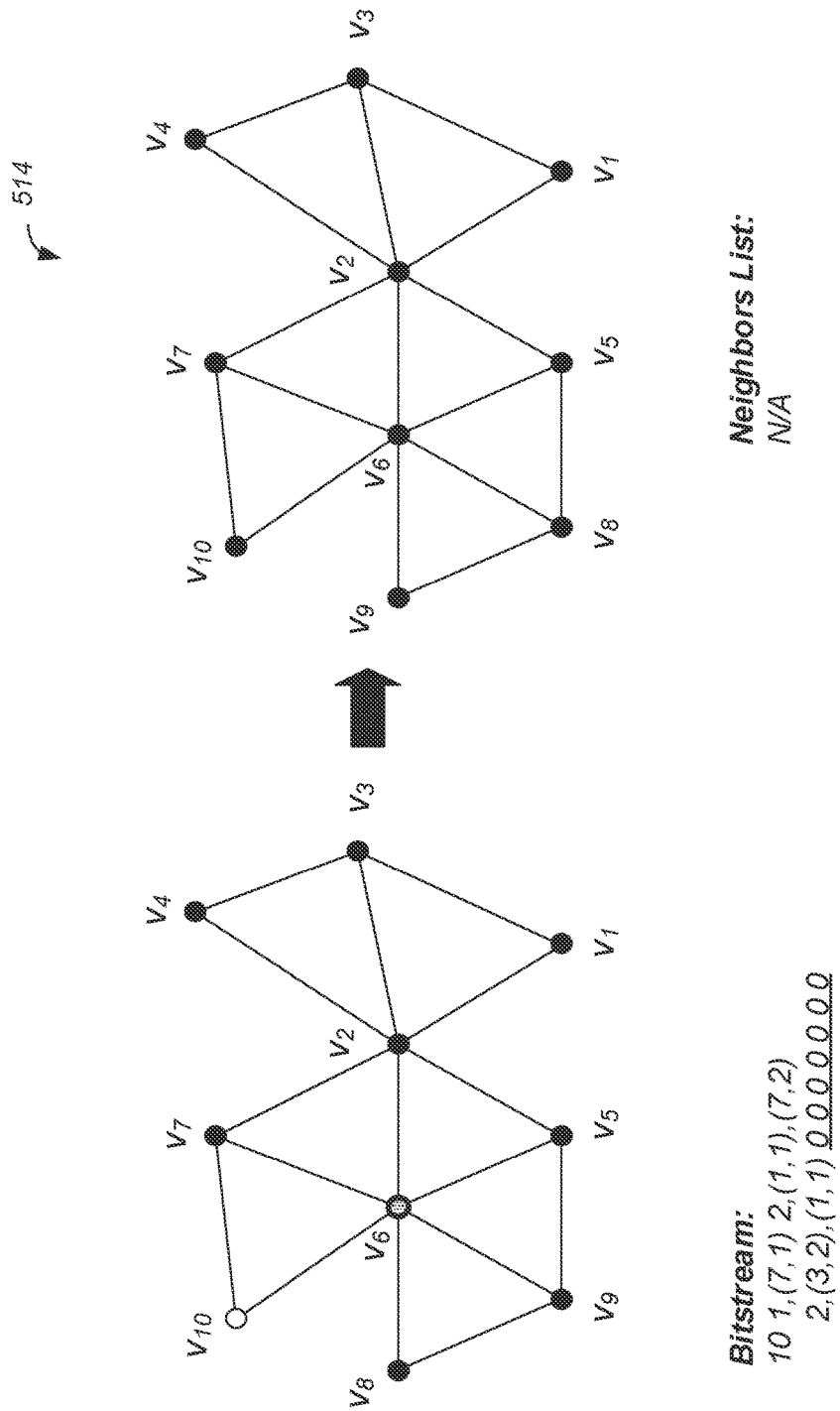

Further, as shown in FIG. 5F, the decoder 106 parses the data "0 0 0 0 0 0," and recognizes that no additional triangle groups remain, and refrains from adding any additional triangles. The regarding polygon mesh 514 is the same as, or otherwise approximates, the original polygon mesh 112. The polygon mesh 514 can be included in a set of decoded data 116, and can be used to generate and present visual content to a user (e.g., using the renderer 108 and/or the output device 110 described with reference to FIG. 1).

As described above, in a geometry-based traversal, a vertex's position in the traversal order can be determined based on the sum of one or more angles formed by the previously encoded triangles that are incident to that vertex. A vertex having a larger angular sum can be prioritized in the traversal order over a vertex having a smaller angular sum.

In some implementations, the angle formed by a previously encoded triangle can be calculated based on a function that receives two vectors as an input (e.g., vectors representing the edges of a triangle extending from a common vertex) and outputs an angle between the two vectors. In some implementations, the output can be determined based on a trigonometric function, such as a cosine function or a sine function. In some implementations, the output can be outputted according to a particular degree of precision (e.g., a particular number of significant digits).

In some implementations, the angle formed by a previously encoded triangle can be calculated based on a function that receives two vectors as an input (e.g., vectors representing the edges of a triangle extending from a common vertex) and outputs an angle between the two vectors according to a particular quantization scale, without the use of trigonometric function (e.g., without the use of a cosine function or a sine function) and/or without the use of floating point numbers. As an example, a quantitation scale can include a sequence of discrete quantized values $0, n_1, \ldots, n_i$ (e.g., integer values), where 0 represents a minimum angle that can be represented using the scale (e.g., 0 degrees) and $n_i$ represents a maximum angle that can be represented using the scale (e.g., 180 degrees). The function can output an approximation of the angle according to the quantization scale (e.g., by determining the quantized value that most closely approximates the angle). This technique can be beneficial, for example, in reducing the amount of computation resources expended by the computer system to calculate the angle between two vectors (e.g., compared to the amount of computation resources expended by the computer system to calculate the angle between two vectors according to a greater degree of precision, such as using trigonometric functions).

In some implementations, the quantized approximation of an angle between two vectors (u0, u1, u2) and (v0, v1, v2) can be calculated using the following example pseudo-code function:

```
angle ComputeAngle (u0, u1, u2, v0, v1, v2) {
    Given vector1 (u0,u1,u2) and vector2 (v0,v1,v2):
    x = u0 * v0 + u1 * v1 + u2 * v2;
```
-continued
```
    if (x == 0) return 16;
    a = abs(u1 * v2 - u2 * v1);
    b = abs(u2 * v0 - u0 * v2);
    c = abs(u0 * v1 - u1 * v0);
    if (a >= b && a >= c) y = a + ((b + c) >> 2);
    else if (b >= c) y + b + ((a + c) >> 2);
    else y = c + ((a + b) >> 2);
    if (x >= 0) return (y << 4) / (x + y);
    else {
        mx = (-x);
        return 16 + (mx << 4) / (mx + y);
    }
}
```

In this example, the quantized scale extends from the integer value 0 to the integer value 32. According to the quantized scale, a 180 degree angle corresponds to the integer value 32, a 90 degree angle corresponds to the integer value 16, and a 0 degree angle corresponds to the integer value 0.

If a particular technique is used by the encoder to calculate angles between vectors (e.g., when generating the encoded content 114), that same technique is also used by the decoder to process the encoded information (e.g., to generate the decoded data 116). For example, if a particular function is used by the encoder the calculate angles between vectors, an inverse of that function can be used by the decoder to process the encoded information. In some implementations, the technique that was used to calculate an angle between two vectors can be signaled in the encoded content. In some implementations, the technique can be pre-determined (e.g., such that an encoder and decoder process data using the same technique).

Further, if a particular technique is used by the encoder to generate a traversal order (e.g., when generating the encoded content 114), that same technique is also used by the decoder to process the encoded information (e.g., to generate the decoded data 116). In some implementations, the technique that was used to determine a traversal order can be signaled in the encoded content. In some implementations, the technique can be pre-determined (e.g., such that an encoder and decoder process data using the same technique).

Figures 6A, 6B:
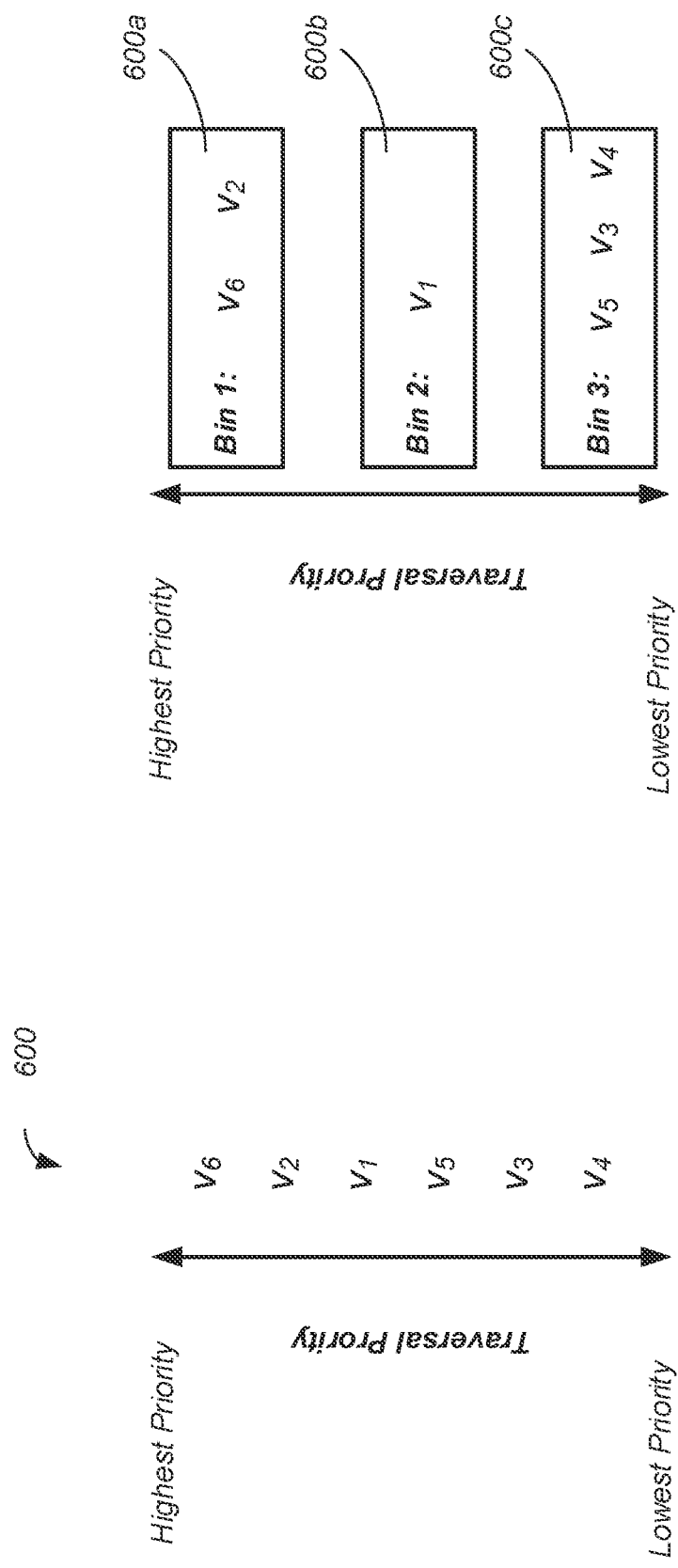
FIG. 6A is a diagram of an example list of ordered vertices.
FIG. 6B is a diagram of example data bins for ordering vertices.

As described above, the vertices of a polygon mesh can be ordered according to a particular traversal order (e.g., using valence-based traversal or geometry-based traversal). In some implementation, each of the vertices in a polygon mesh can be ranked in priority relative to every other vertex. As an example, as shown in FIG. 6A, vertices can be ranked according to a list 600, and the vertices can be traversed in order according to that list. As described above, the rank of a vertex can be determined based on a valence-based approach or according to a geometry-based approach.

In some implementation, the vertices of a polygon mesh can be ordered according to a number of finite data bins. Vertices that have been assigned to a higher priority data bin can be prioritized for traversal over vertices that have been assigned to a lower priority data bin. Vertices that have been assigned to the same data bin can be traversed according to a random order, or according a pre-determined ordering criteria (e.g., in sequence according to an identifier or serial number assigned to each vertex). Vertices can be assigned to a data bin based on a valence-based approach (e.g., where each data bin represents a particular number or range of numbers of previously encoded triangles that are incident to a vertex) or according to a geometry-based approach (e.g., where each data bin represents a particular range of angles formed by previously encoded triangles that are incident to a vertex).

As an example, as shown in FIG. 6B, vertices can be ranked according to several bins 600a-600c. Vertices assigned to the highest priority bin (e.g., the vertices $v_6$ and $v_2$ in the bin 600a) can be traversed first, followed by the vertices assigned to the second highest priority bin (e.g., the vertex $v_1$ bin 600b), followed by the vertices assigned to the next highest priority bin (e.g., the vertices $v_5$, $v_3$, and $v_4$ in the bin 600c), and so forth. Vertices that have been assigned to the same data bin can be traversed according to a random order, or according a pre-determined ordering criteria.

This technique can be beneficial, for example, in reducing the amount of computation resources expended by the computer system to determine a traversal order for a number of vertices (e.g., compared to the amount of computation resources expended by the computer system to rank each vertex in priority relative to each and every vertex).

In some implementations, the encoder 102 can also generate additional information regarding the relationships between vertices, and include this additional information in the encoded content 114. As an example, the encoder 102 can identify, for a first vertex of a polygon mesh, a vertex that is to the left of the first vertex, a vertex that is to the left of the first vertex, a pivot point that is to the left of the right vertex, and/or a pivot point that is to the right of the right vertex. The encoder 102 can identify similar information for each of the other vertices of the polygon mesh This technique can be beneficial, for example, in facilitating the encoding and/or decoding of visual content. For instance, as described above, at least some of the candidate configurations used to encode information regarding a polygon mesh (e.g., the example candidate configurations shown in FIGS. 3A-3I) correspond to the encoding of triangles incident to vertices to the left of a particular pivot point and/or vertices to the left of a particular pivot point. The identities of the pivot points and the vertices to the left and/or right of the pivot points can be expressly signaled in the encoded content 114, such that the decoder 106 can recreate or regenerate a polygon mesh in a more accurate manner.

An example signaling process is shown in FIGS. 7A-7E.

Figure 7A:
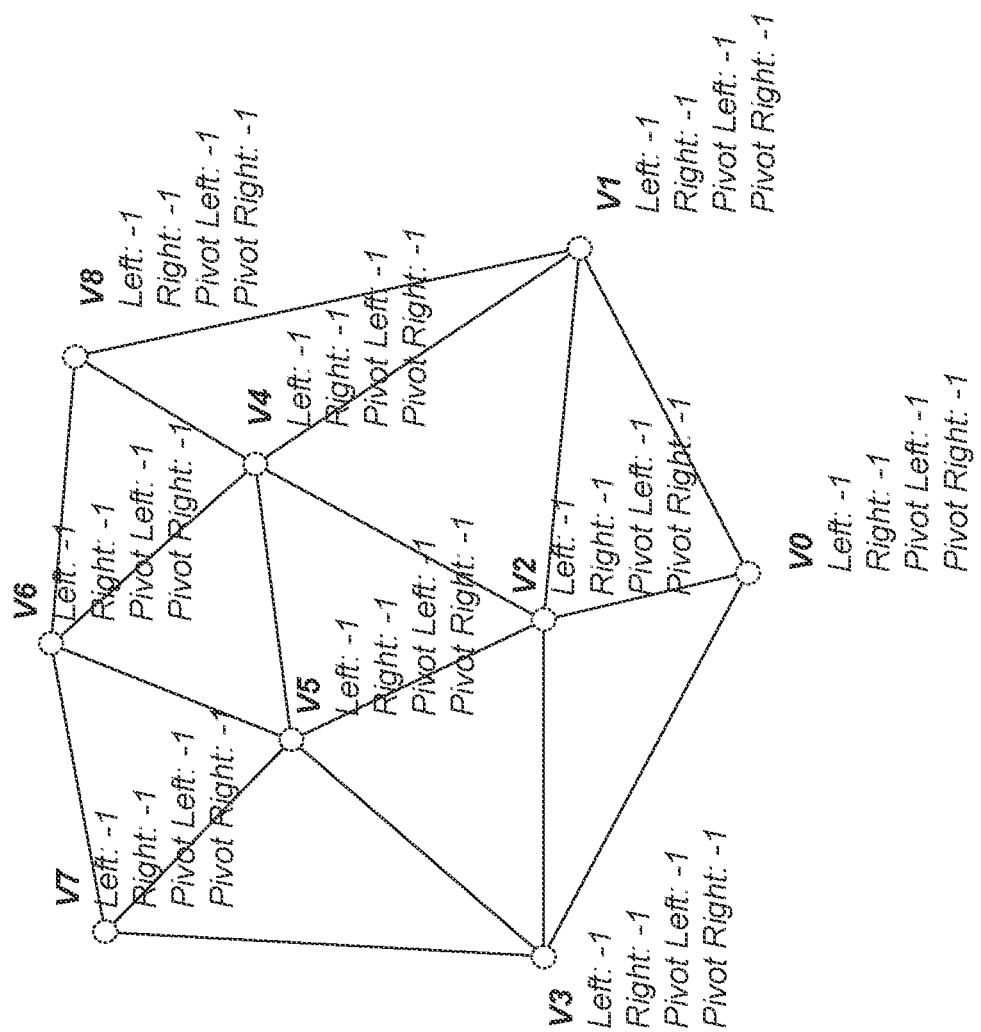
FIGS. 7A-7E are diagrams showing an example process for signaling additional information regarding a polygon mesh in encoded content.

As shown in FIG. 7A, a polygon mesh 700 includes several interconnected vertices $v_0$ to $v_8$. Initially, for each of the vertices, the encoder 102 can record placeholder information regarding a previously encoded vertex to the left of that vertex, a previously encoded vertex to the right of that vertex, a previously encoded pivot point to the left of that vertex, and a previously encoded pivot point to the right of that vertex. As an example, for each of the vertices, the encoder 102 can generate placeholder values of "−1" (e.g., a value that does not correspond to any of the vertices).

As described above, the encoder 102 can encode information regarding triangles incident to a first vertex (e.g., the vertex $v_0$). Further, the encoder 102 can encode additional information regarding each of the vertices that are incident to those triangles.

Figure 7B:
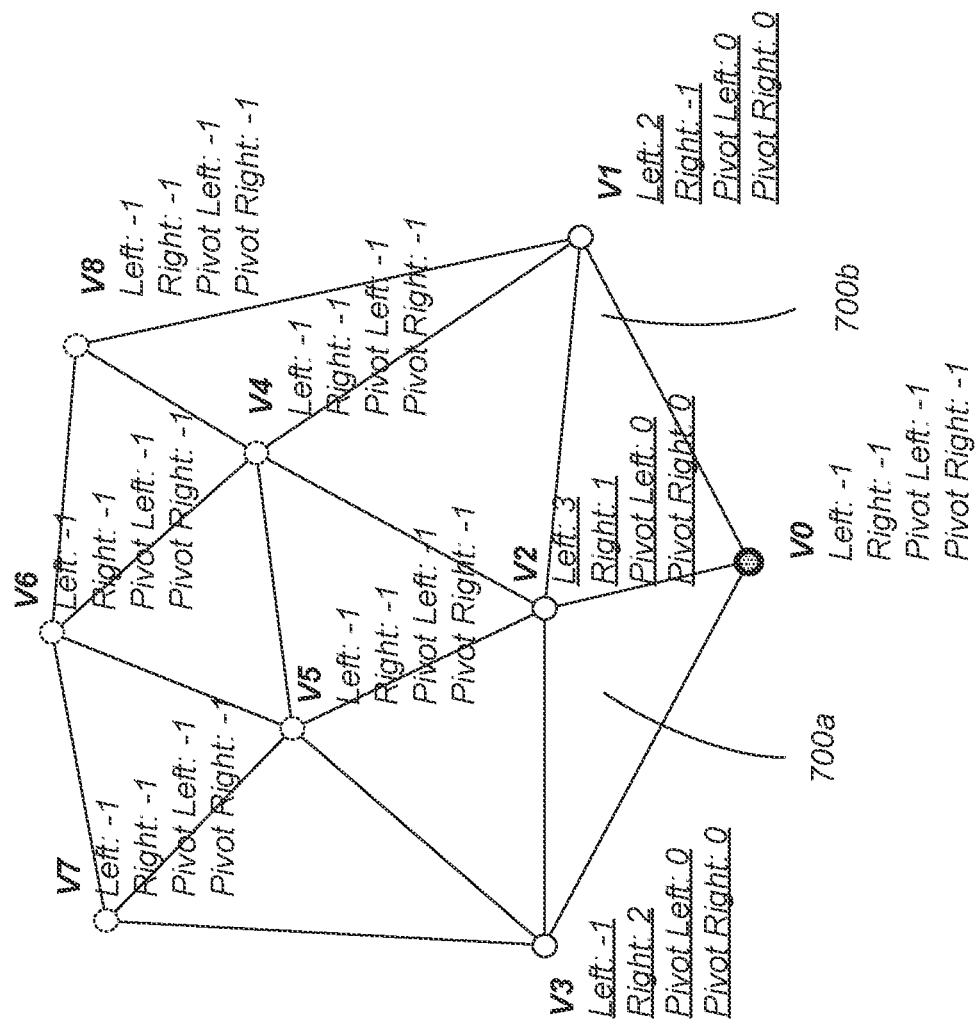

For example, referring to FIG. 7B, the encoder 102 can encode information regarding triangles 700a and 700b incident to the vertex $v_0$ (which acts as a pivot point). This information can be encoded, for example, in a similar manner as described with reference to FIGS. 4A-4F. Further, the encoder 102 can identify, for each of the newly encoded vertices $v_1$, $v_2$, and $v_3$, (i) a vertex to the left of that vertex, (ii) a vertex to the right of that vertex, (iii) a pivot point to the left of that vertex, and (iv) a pivot point to the right of that vertex (if any). If no such vertex (or vertices) exist, the encoder 102 can maintain the placeholder value (e.g., −1).

For example, referring to FIG. 7B, the vertex $v_1$ has (i) the vertex $v_2$ to its left, (ii) no vertex to its right, (iii) the pivot point vertex $v_0$ to its left, and (iv) the pivot point vertex $v_0$ to its right. This information can be signaled, for example, by indicating the left vertex using the value "2," the right vertex using the value "−1" (as no such vertex exists), the right pivot vertex using the value "0," and the left pivot vertex using the value "0."

Further, the vertex $v_2$ has (i) the vertex $v_3$ to its left, (ii) the vertex $v_1$ to its left, (iii) the pivot point vertex $v_0$ to its left, and (iv) the pivot point vertex $v_0$ to its right. This information can be signaled, for example, by indicating the left vertex using the value "3," the right vertex using the value "1," the right pivot vertex using the value "0," and the left pivot vertex using the value "0."

Further, the vertex $v_3$ has (i) no vertex to its left, (ii) the vertex $v_2$ to its right, (iii) the pivot point vertex $v_0$ to its left, and (iv) the pivot point vertex $v_0$ to its right. This information can be signaled, for example, by indicating the left vertex using the value "−1" (as no such vertex exists), the right vertex using the value "2," the right pivot vertex using the value "0," and the left pivot vertex using the value "0."

This process can be repeated for each newly encoded vertex. For example, referring to FIG. 7C, the encoder 102 can encode information regarding triangles 700c-700e incident to the vertex $v_2$ (which acts as a pivot point). This information can be encoded, for example, in a similar manner as described with reference to FIGS. 4A-4F. Further, the encoder 102 can identify, for each of the newly encoded vertices $v_5$ and $v_6$, (i) a vertex to the left of that vertex, (ii) a vertex to the right of that vertex, (iii) a pivot point to the left of that vertex, and (iv) a pivot point to the right of that vertex (if any). If no such vertex (or vertices) exist, the encoder 102 can maintain the placeholder value (e.g., −1).

Figure 7C:
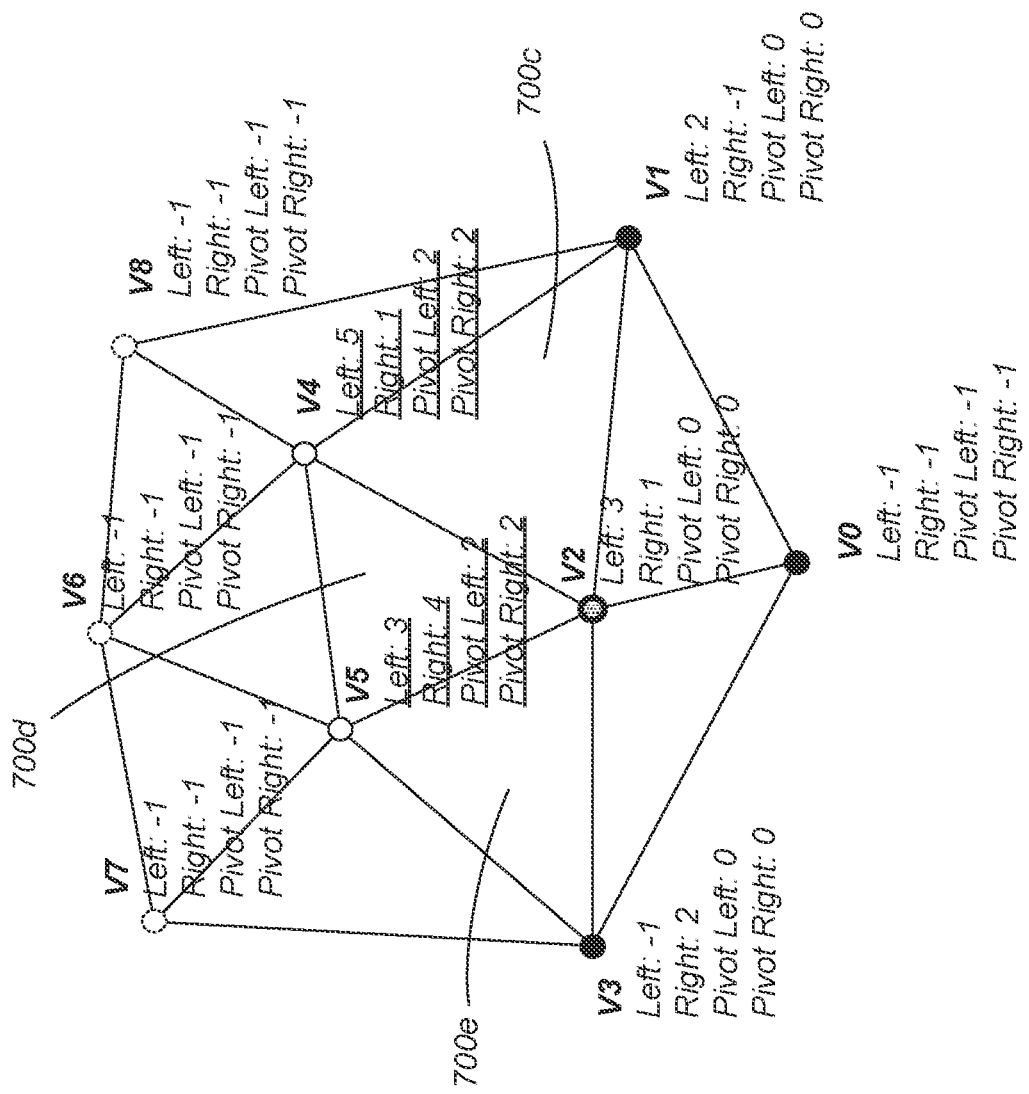

For example, referring to FIG. 7C, the vertex $v_4$ has (i) the vertex $v_5$ to its left, (ii) the vertex $v_1$ to its right, (iii) the pivot point vertex $v_2$ to its left, and (iv) the pivot point vertex $v_2$ to its right. This information can be signaled, for example, by indicating the left vertex using the value "5," the right vertex using the value "1," the right pivot vertex using the value "2," and the left pivot vertex using the value "2."

Further, referring to FIG. 7C, the vertex $v_5$ has (i) the vertex $v_3$ to its left, (ii) the vertex $v_4$ to its right, (iii) the pivot point vertex $v_2$ to its left, and (iv) the pivot point vertex $v_2$ to its right. This information can be signaled, for example, by indicating the left vertex using the value "3," the right vertex using the value "4," the right pivot vertex using the value "2," and the left pivot vertex using the value "2."

Figure 7D:
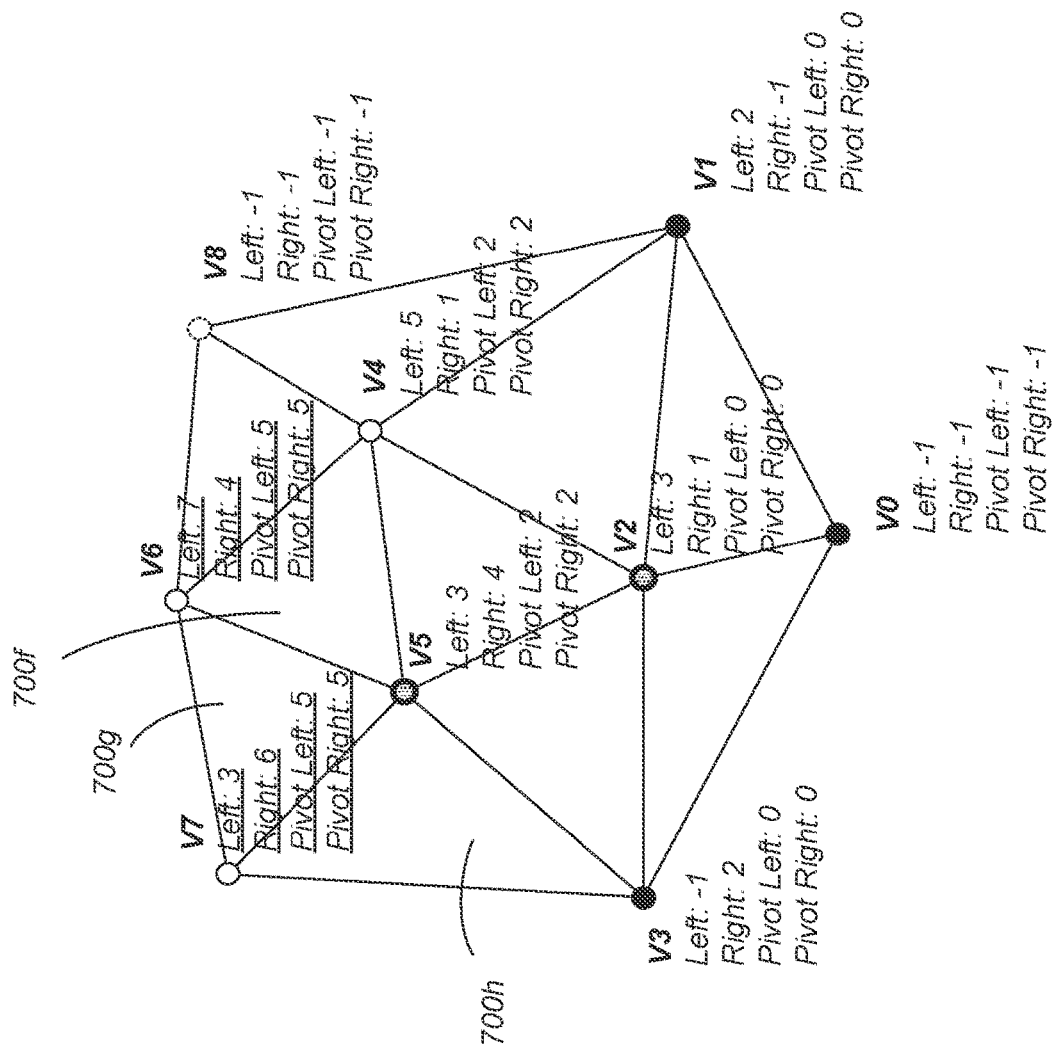

Further, referring to FIG. 7D, the encoder 102 can encode information regarding triangles 700f-700h incident to the vertex $v_5$ (which acts as a pivot point). This information can be encoded, for example, in a similar manner as described with reference to FIGS. 4A-4F. Further, the encoder 102 can identify, for each of the newly encoded vertices $v_6$ and $v_7$, (i) a vertex to the left of that vertex, (ii) a vertex to the right of that vertex, (iii) a pivot point to the left of that vertex, and (iv) a pivot point to the right of that vertex (if any). If no such vertex (or vertices) exist, the encoder 102 can maintain the placeholder value (e.g., −1).

For example, referring to FIG. 7D, the vertex $v_6$ has (i) the vertex $v_7$ to its left, (ii) the vertex $v_4$ to its right, (iii) the pivot point vertex $v_5$ to its left, and (iv) the pivot point vertex $v_5$ to its right. This information can be signaled, for example, by indicating the left vertex using the value "7," the right vertex using the value "4," the right pivot vertex using the value "5," and the left pivot vertex using the value "5."

For example, referring to FIG. 7D, the vertex $v_7$ has (i) the vertex $v_3$ to its left, (ii) the vertex $v_6$ to its right, (iii) the pivot point vertex $v_5$ to its left, and (iv) the pivot point vertex $v_5$ to its right. This information can be signaled, for example, by indicating the left vertex using the value "3," the right vertex using the value "6," the right pivot vertex using the value "5," and the left pivot vertex using the value "5."

Figure 7E:
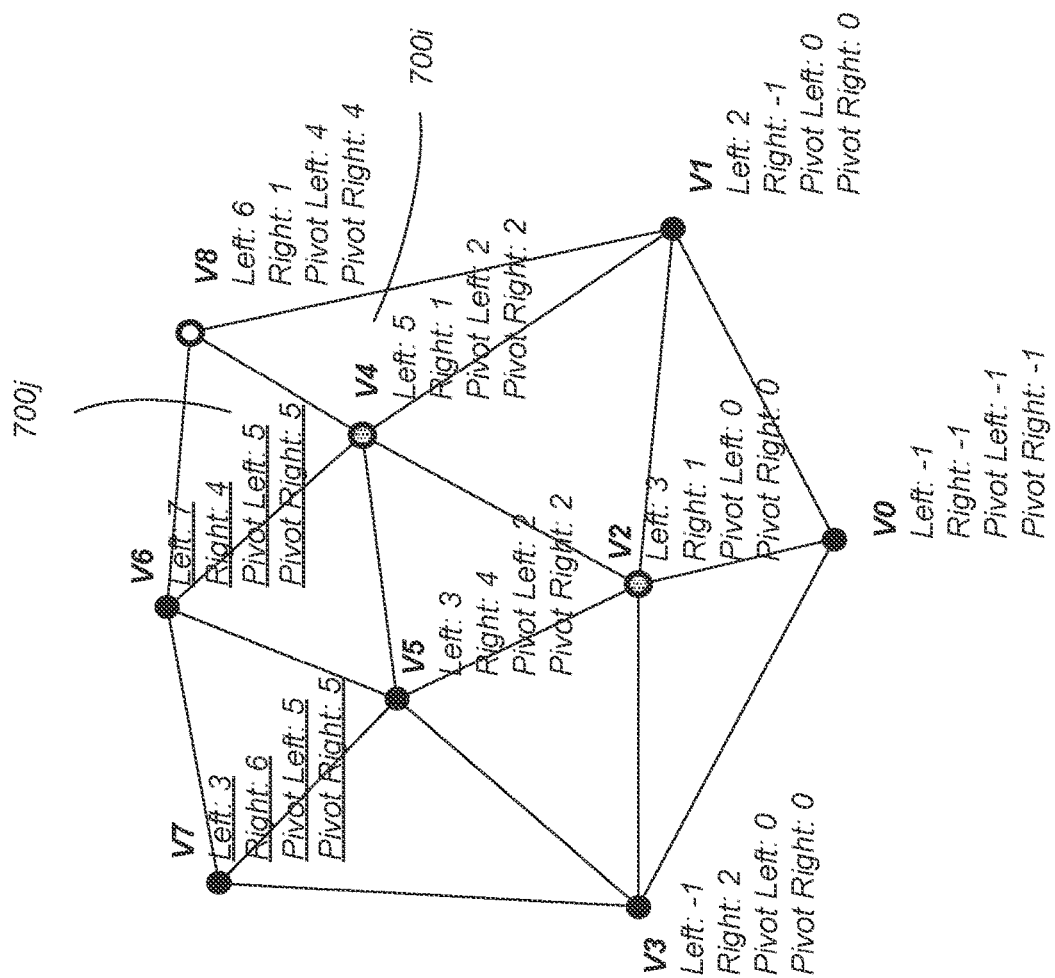

Further, referring to FIG. 7E, the encoder 102 can encode information regarding triangles 700$i$ and 700$j$ incident to the vertex $v_5$ (which acts as a pivot point). This information can be encoded, for example, in a similar manner as described with reference to FIGS. 4A-4F. Further, the encoder 102 can identify, for the newly encoded vertex $v_8$, (i) a vertex to the left of that vertex, (ii) a vertex to the right of that vertex, (iii) a pivot point to the left of that vertex, and (iv) a pivot point to the right of that vertex (if any). If no such vertex (or vertices) exist, the encoder 102 can maintain the placeholder value (e.g., −1).

For example, referring to FIG. 7E, the vertex $v_8$ has (i) the vertex $v_6$ to its left, (ii) the vertex $v_1$ to its right, (iii) the pivot point vertex $v_4$ to its left, and (iv) the pivot point vertex $v_4$ to its right. This information can be signaled, for example, by indicating the left vertex using the value "6," the right vertex using the value "1," the right pivot vertex using the value "4," and the left pivot vertex using the value "4."

The information described above can be stored in the encoded content 114 as a data stream, as one or more data records (e.g., having one or more respective fields), or according to any other data structure.

Example Processes

Figure 9:
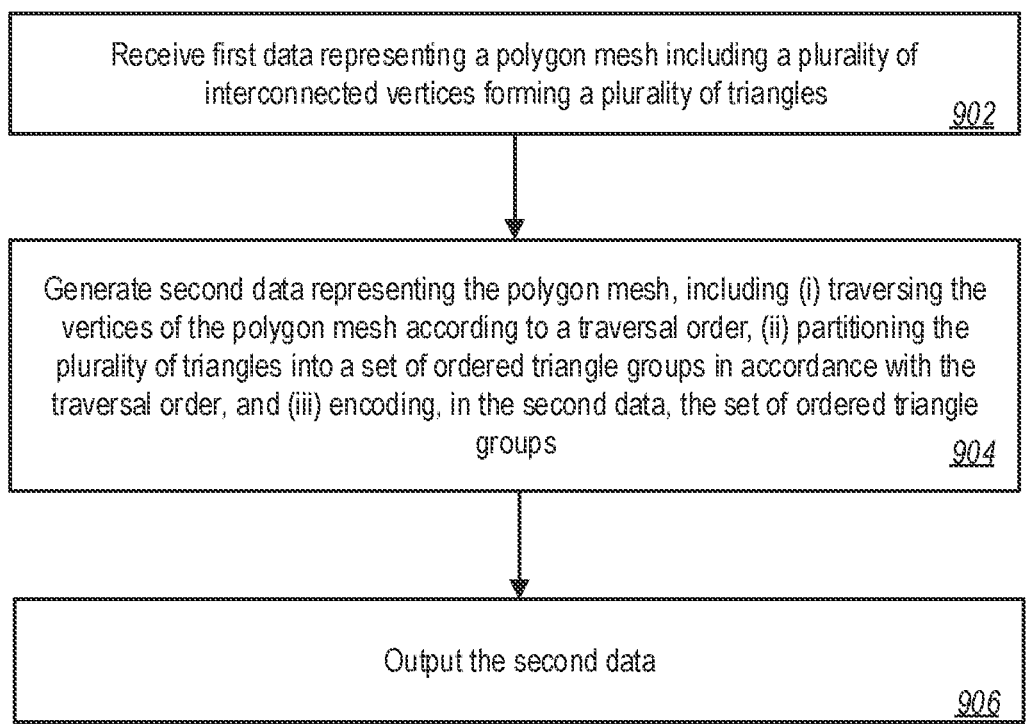
FIG. 9 is a diagram of an example process for encoding information regarding a polygon mesh

FIG. 9 shows an example process 900 for encoding information regarding a polygon mesh. The process 900 can be performed, at least in part, using one or more devices (e.g., one or more of the computer systems shown in FIG. 10).

According to the process 900, a system receives first data representing a polygon mesh (block 902). The polygon mesh includes a plurality of interconnected vertices forming a plurality of triangles. An example polygon mesh is shown, for instance, in FIG. 2. The first data can include information regarding the positions of each of the vertices in the polygon mesh, one or more interconnections (e.g., edges) between those vertices, and/or one or more faces defined by the vertices and edges.

The system generates second data representing the polygon mesh (block 904). As an example, the system can generate encoded content 114 (e.g., as described with reference to FIGS. 1, 3A-3I, and 4A-4E).

Generating the second data includes traversing the vertices of the polygon mesh according to a traversal order.

In some implementations, a position each of the vertices in the transversal order can be determined based on a number of previously encoded triangles that are incident to that vertex (e.g., according to a valence-based traversal).

In some implementations, a position each of the vertices in the transversal order can be determined based a sum of one or more angles formed by the previously encoded triangles that are incident to that vertex (e.g., a geometry-based traversal). The sum of the one or more angles can be determined by (i) determining, for each of the previously encoded triangles that are incident to that vertex, an angle formed by that triangle according to a quantized scale, and (ii) summing the determined angles.

Generating the second data also includes partitioning the plurality of triangles into a set of ordered triangle groups in accordance with the traversal order. In some implementation, the set of ordered triangle groups can include one or more triangle fans. The triangle fans can include a plurality of abutting triangles. As an example, the triangles can be partitioned into a set of triangular fans, as described with reference to FIGS. 3A-3I and 4A-4E.

In some implementations, the traversal order can be determined by generating a plurality of data bins, and for each vertex, (i) determining a priority value for that vertex, and (ii) assigning that vertex to one of the data bins based on the priority value. For each vertex, the priority value of that vertex can determined based on (i) the number of previously encoded triangles that are incident to that vertex, and/or (ii) the sum of the one or more angles formed by the previously encoded triangles that are incident to that vertex.

Generating the second data also includes encoding, in the second data, the set of ordered triangle groups. As an example, the system can generate encoded content according to the example technique described with reference to FIGS. 3A-3I and 4A-4E.

In some implementations, encoding the set of ordered triangle groups can include, for each traversed vertex (i) identifying a triangle group incident to that vertex that has not yet been encoded, (ii) selecting, from among a set of templates, a first template based on a characteristic of the triangle group, (iii) encoding, in the second data, an indication of the first template. The characteristic of the triangle group can include a position of the triangle group relative to one or more previously encoded triangles.

Further, in some implementations, the set of templates can include exactly nine templates, where each of the templates is different from each of the other templates. An example set of nine templates is shown in FIGS. 3A-3I.

The system outputs the second data (block 906). As an example, referring to FIG. 1, the system can output encoded content 114 to a decoder 106 (e.g., via a network 104) for further processing.

In some implementations, the system can also encode, in the second data, and for each of the vertices, (i) an identifier of a first vertex to the right of that vertex, (ii) an identifier of a second vertex to the left of that vertex, (iii) an identifier of a third vertex to the left of that vertex and that is common to at least one of the triangle groups (e.g., a left "pivot point"), and/or (iv) an identifier of a fourth vertex to the right of that vertex and that is common to at least one of the triangle groups (e.g., a right "pivot point").

Example Computer System

Figure 10:
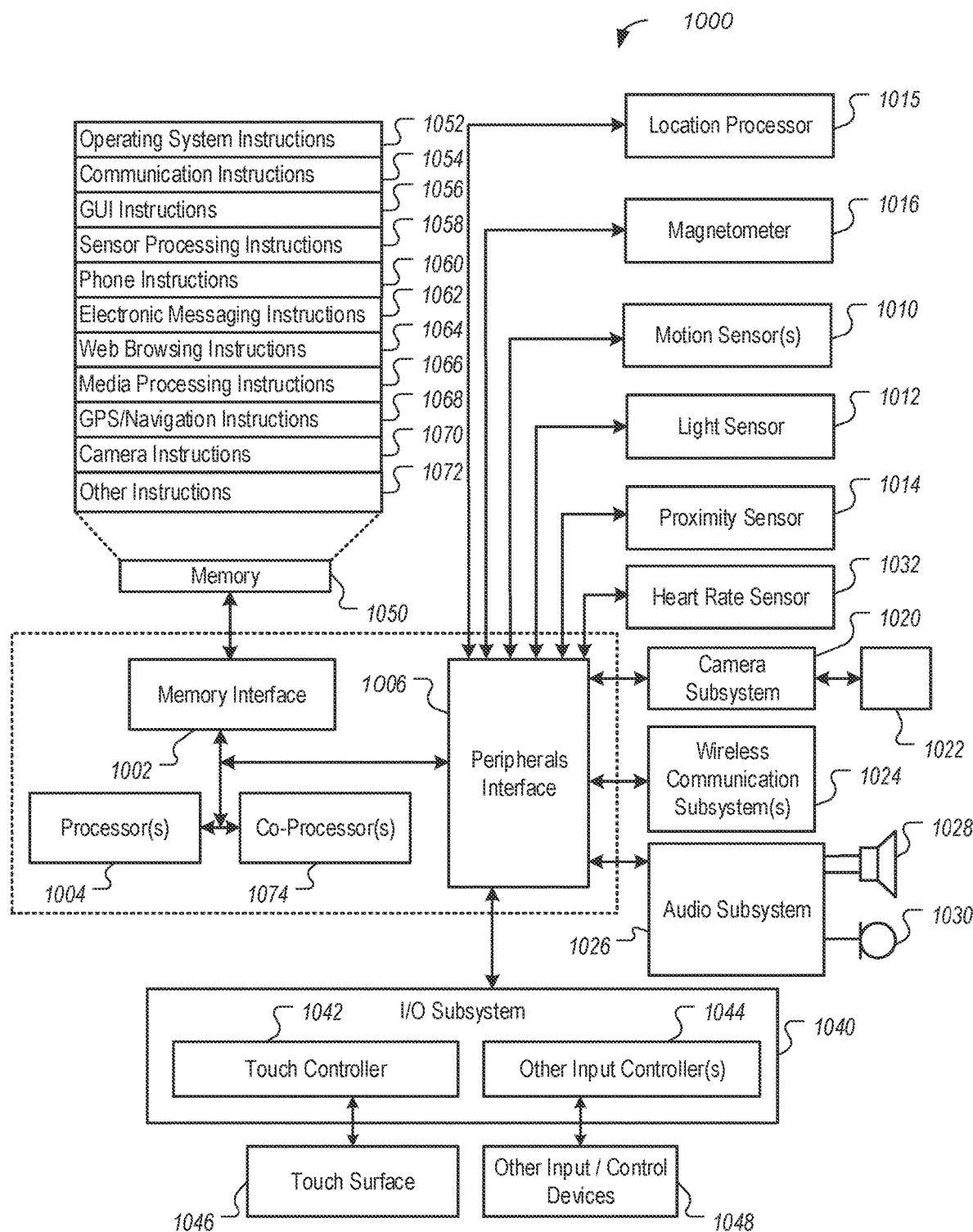
FIG. 10 is a diagram of an example device architecture for implementing the features and processes described in reference to FIGS. 1-9.

FIG. 10 is a block diagram of an example device architecture 1000 for implementing the features and processes described in reference to FIGS. 1-9. For example, the architecture 1000 can be used to implement the system 100 and/or one or more components of the system 100. The architecture 1000 may be implemented in any device for generating the features described in reference to FIGS. 1-9, including but not limited to desktop computers, server computers, portable computers, smart phones, tablet computers, game consoles, wearable computers, holographic displays, set top boxes, media players, smart TVs, and the like.

The architecture 1000 can include a memory interface 1002, one or more data processor 1004, one or more data co-processors 1074, and a peripherals interface 1006. The memory interface 1002, the processor(s) 1004, the co-processor(s) 1074, and/or the peripherals interface 1006 can be separate components or can be integrated in one or more integrated circuits. One or more communication buses or signal lines may couple the various components.

The processor(s) 1004 and/or the co-processor(s) 1074 can operate in conjunction to perform the operations described herein. For instance, the processor(s) 1004 can include one or more central processing units (CPUs) that are configured to function as the primary computer processors for the architecture 1000. As an example, the processor(s) 1004 can be configured to perform generalized data processing tasks of the architecture 1000. Further, at least some of the data processing tasks can be offloaded to the co-processor(s) 1074. For example, specialized data processing tasks, such as processing motion data, processing image data, encrypting data, and/or performing certain types of arithmetic operations, can be offloaded to one or more specialized co-processor(s) 1074 for handling those tasks. In some cases, the processor(s) 1004 can be relatively more powerful than the co-processor(s) 1074 and/or can consume more power than the co-processor(s) 1074. This can be useful, for example, as it enables the processor(s) 1004 to handle generalized tasks quickly, while also offloading certain other tasks to co-processor(s) 1074 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 1004 for further analysis.

Sensors, devices, and subsystems can be coupled to peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions of the architecture 1000. For example, in some implementations, a light sensor 1012 can be utilized to facilitate adjusting the brightness of a touch surface 1046. In some implementations, a motion sensor 1010 can be utilized to detect movement and orientation of the device. For example, the motion sensor 1010 can include one or more accelerometers (e.g., to measure the acceleration experienced by the motion sensor 1010 and/or the architecture 1000 over a period of time), and/or one or more compasses or gyros (e.g., to measure the orientation of the motion sensor 1010 and/or the mobile device). In some cases, the measurement information obtained by the motion sensor 1010 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 1010 can be directly integrated into a co-processor 1074 configured to processes measurements obtained by the motion sensor 1010. For example, a co-processor 1074 can include one more accelerometers, compasses, and/or gyroscopes, and can be configured to obtain sensor data from each of these sensors, process the sensor data, and transmit the processed data to the processor(s) 1004 for further analysis.

Other sensors may also be connected to the peripherals interface 1006, such as a temperature sensor, a biometric sensor, or other sensing device, to facilitate related functionalities. As an example, as shown in FIG. 10, the architecture 1000 can include a heart rate sensor 1032 that measures the beats of a user's heart. Similarly, these other sensors also can be directly integrated into one or more co-processor(s) 1074 configured to process measurements obtained from those sensors.

A location processor 1015 (e.g., a GNSS receiver chip) can be connected to the peripherals interface 1006 to provide geo-referencing. An electronic magnetometer 1016 (e.g., an integrated circuit chip) can also be connected to the peripherals interface 1006 to provide data that may be used to determine the direction of magnetic North. Thus, the electronic magnetometer 1016 can be used as an electronic compass.

A camera subsystem 1020 and an optical sensor 1022 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 1024. The communication subsystem(s) 1024 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 1024 can depend on the communication network(s) or medium(s) over which the architecture 1000 is intended to operate. For example, the architecture 1000 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 1000 can be configured as a base station for other wireless devices. As another example, the communication subsystems may allow the architecture 1000 to synchronize with a host device using one or more protocols, such as, for example, the TCP/IP protocol, HTTP protocol, UDP protocol, and any other known protocol.

An audio subsystem 1026 can be coupled to a speaker 1028 and one or more microphones 1030 to facilitate voice-enabled functions, such as voice recognition, voice replication, digital recording, and telephony functions.

An I/O subsystem 1040 can include a touch controller 1042 and/or other input controller(s) 1044. The touch controller 1042 can be coupled to a touch surface 1046. The touch surface 1046 and the touch controller 1042 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 1046. In one implementation, the touch surface 1046 can display virtual or soft buttons and a virtual keyboard, which can be used as an input/output device by the user.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In some implementations, the architecture 1000 can present recorded audio and/or video files, such as MP3, AAC, and MPEG video files. In some implementations, the architecture 1000 can include the functionality of an MP3 player and may include a pin connector for tethering to other devices. Other input/output and control devices may be used.

A memory interface 1002 can be coupled to a memory 1050. The memory 1050 can include high-speed random access memory or non-volatile memory, such as one or more magnetic disk storage devices, one or more optical storage devices, or flash memory (e.g., NAND, NOR). The memory 1050 can store an operating system 1052, such as Darwin, RTXC, LINUX, UNIX, OS X, WINDOWS, or an embedded operating system such as VxWorks. The operating system 1052 can include instructions for handling basic system services and for performing hardware dependent tasks. In some implementations, the operating system 1052 can include a kernel (e.g., UNIX kernel).

The memory 1050 can also store communication instructions 1054 to facilitate communicating with one or more additional devices, one or more computers or servers, including peer-to-peer communications. The communication instructions 1054 can also be used to select an operational mode or communication medium for use by the device, based on a geographic location (obtained by the GPS/Navigation instructions 1068) of the device. The memory 1050 can include graphical user interface instructions 1056 to facilitate graphic user interface processing, including a touch model for interpreting touch inputs and gestures; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1069 to facilitate GPS and navigation-related processes; camera instructions 1070 to facilitate camera-related processes and functions; and other instructions 1072 for performing some or all of the processes described herein.

Each of the above identified instructions and applications can correspond to a set of instructions for performing one or more functions described herein. These instructions need not be implemented as separate software programs, procedures, or modules. The memory 1050 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of mesh and point cloud data available from various sources to improve services a mobile device can provide to a user. The present disclosure further contemplates that the entities responsible for the collection, analysis, disclosure, transfer, storage, or other use of mesh and point cloud data representative of personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving first data representing a polygon mesh, wherein the polygon mesh comprises a plurality of interconnected vertices forming a plurality of triangles;
generating second data representing the polygon mesh, wherein generating the second data comprises:
traversing the vertices of the polygon mesh according to a traversal order,
partitioning the plurality of triangles into a set of ordered triangle groups in accordance with the traversal order, and
encoding, in the second data, the set of ordered triangle groups; and
outputting the second data,
wherein a position each of the vertices in the traversal order is determined based on at least one of:
a number of previously encoded triangles that are incident to that vertex, or
a sum of one or more angles formed by the previously encoded triangles that are incident to that vertex.

2. The method of claim 1, wherein the set of ordered triangle groups comprises one or more triangle fans.

3. The method of claim 2, wherein at least one of the triangle fans comprises a plurality of abutting triangles.

4. The method of claim 1, wherein the sum of the one or more angles is determined by:
determining, for each of the previously encoded triangles that are incident to that vertex, an angle formed by that triangle according to a quantized scale, and
summing the determined angles.

5. The method of claim 1, wherein the traversal order is determined by:
generating a plurality of data bins; and
for each vertex:
determining a priority value for that vertex, and
assigning that vertex to one of the data bins based on the priority value.

6. The method of claim 5, wherein for each vertex, the priority value of that vertex is determined based on at least one of:
the number of previously encoded triangles that are incident to that vertex, or
the sum of the one or more angles formed by the previously encoded triangles that are incident to that vertex.

7. The method of claim 1, further comprising:
encoding, in the second data, and for each of the vertices, at least one of:
an identifier of a first vertex to the right of that vertex,
an identifier of a second vertex to the left of that vertex,
an identifier of a third vertex to the left of that vertex and that is common to at least one of the triangle groups, or
an identifier of a fourth vertex to the right of that vertex and that is common to at least one of the triangle groups.

8. The method of claim 1, wherein encoding the set of ordered triangle groups comprises:
for each traversed vertex:
identifying a triangle group incident to that vertex that has not yet been encoded;
selecting, from among a set of templates, a first template based on a characteristic of the triangle group, and
encoding, in the second data, an indication of the first template.

9. The method of claim 8, wherein the set of templates consists of nine templates, wherein each of the templates is different from each of the other templates.

10. The method of claim 8, wherein the characteristic of the triangle group comprises a position of the triangle group relative to one or more previously encoded triangles.

11. A device comprising:
one or more processors; and
memory storing instructions that when executed by the one or more processors, cause the one or more processors to perform operations comprising:

receiving first data representing a polygon mesh, wherein the polygon mesh comprises a plurality of interconnected vertices forming a plurality of triangles;

generating second data representing the polygon mesh, wherein generating the second data comprises:
    traversing the vertices of the polygon mesh according to a traversal order,
    partitioning the plurality of triangles into a set of ordered triangle groups in accordance with the traversal order, and
    encoding, in the second data, the set of ordered triangle groups; and
outputting the second data,
wherein a position each of the vertices in the traversal order is determined based on at least one of:
    a number of previously encoded triangles that are incident to that vertex, or
    a sum of one or more angles formed by the previously encoded triangles that are incident to that vertex.

12. The device of claim 11, wherein the set of ordered triangle groups comprises one or more triangle fans.

13. The device of claim 12, wherein at least one of the triangle fans comprises a plurality of abutting triangles.

14. The device of claim 11, wherein the sum of the one or more angles is determined by:
    determining, for each of the previously encoded triangles that are incident to that vertex, an angle formed by that triangle according to a quantized scale, and
    summing the determined angles.

15. The device of claim 11, wherein the traversal order is determined by:
    generating a plurality of data bins; and
    for each vertex:
        determining a priority value for that vertex, and
        assigning that vertex to one of the data bins based on the priority value.

16. The device of claim 15, wherein for each vertex, the priority value of that vertex is determined based on at least one of:
    the number of previously encoded triangles that are incident to that vertex, or
    the sum of the one or more angles formed by the previously encoded triangles that are incident to that vertex.

17. One or more non-transitory, computer-readable storage media having instructions stored thereon, that when executed by one or more processors, cause the one or more processors to perform operations comprising:
    receiving first data representing a polygon mesh, wherein the polygon mesh comprises a plurality of interconnected vertices forming a plurality of triangles;
    generating second data representing the polygon mesh, wherein generating the second data comprises:
        traversing the vertices of the polygon mesh according to a traversal order,
        partitioning the plurality of triangles into a set of ordered triangle groups in accordance with the traversal order, and
        encoding, in the second data, the set of ordered triangle groups; and
    outputting the second data,
    wherein a position each of the vertices in the traversal order is determined based on at least one of:
        a number of previously encoded triangles that are incident to that vertex, or
        a sum of one or more angles formed by the previously encoded triangles that are incident to that vertex.

18. The one or more non-transitory, computer-readable storage media of claim 17, the operations further comprising:
    encoding, in the second data, and for each of the vertices, at least one of:
        an identifier of a first vertex to the right of that vertex,
        an identifier of a second vertex to the left of that vertex,
        an identifier of a third vertex to the left of that vertex and that is common to at least one of the triangle groups, or
        an identifier of a fourth vertex to the right of that vertex and that is common to at least one of the triangle groups.

19. The one or more non-transitory, computer-readable storage media of claim 17, wherein encoding the set of ordered triangle groups comprises:
    for each traversed vertex:
        identifying a triangle group incident to that vertex that has not yet been encoded;
        selecting, from among a set of templates, a first template based on a characteristic of the triangle group, and
        encoding, in the second data, an indication of the first template.

20. The one or more non-transitory, computer-readable storage media of claim 19, wherein the set of templates consists of nine templates, wherein each of the templates is different from each of the other templates.

21. The one or more non-transitory, computer-readable storage media of claim 19, wherein the characteristic of the triangle group comprises a position of the triangle group relative to one or more previously encoded triangles.

* * * * *